(12) United States Patent
Shimamura et al.

(10) Patent No.: US 9,352,218 B2
(45) Date of Patent: May 31, 2016

(54) GAME APPARATUS AND COMPUTER-READABLE STORAGE MEDIUM

(75) Inventors: Takayuki Shimamura, Kyoto (JP); Takeshi Miyamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1311 days.

(21) Appl. No.: 12/504,906

(22) Filed: Jul. 17, 2009

(65) Prior Publication Data

US 2010/0267443 A1  Oct. 21, 2010

(30) Foreign Application Priority Data

Apr. 21, 2009  (JP) ................... 2009-103230
Apr. 21, 2009  (JP) ................... 2009-103231

(51) Int. Cl.
  *A63F 13/00* (2014.01)
  *A63F 13/20* (2014.01)
  *A63F 13/40* (2014.01)

(52) U.S. Cl.
  CPC .............. *A63F 13/06* (2013.01); *A63F 13/10* (2013.01); *A63F 2300/105* (2013.01); *A63F 2300/6027* (2013.01); *A63F 2300/6054* (2013.01); *A63F 2300/8011* (2013.01)

(58) Field of Classification Search
  CPC . A63F 13/06; A63F 13/10; A63F 2300/8011; A63F 2300/6027
  USPC ............................................. 463/1–6, 40–42
  See application file for complete search history.

(56) References Cited

U.S. PATENT DOCUMENTS

| | | | |
|---|---|---|---|
| 8,105,153 B2* | 1/2012 | Buecheler et al. ............... | 463/23 |
| 2006/0046848 A1* | 3/2006 | Abe et al. ......................... | 463/37 |
| 2008/0076565 A1 | 3/2008 | Okamura | |
| 2008/0076567 A1* | 3/2008 | Dohta .............................. | 463/37 |
| 2009/0051653 A1* | 2/2009 | Barney et al. .................. | 345/158 |

FOREIGN PATENT DOCUMENTS

| | | |
|---|---|---|
| JP | 2000-308756 | 11/2000 |
| JP | 2004-113689 | 4/2004 |
| JP | 2008-67876 | 3/2008 |
| JP | 2008-113825 | 5/2008 |

OTHER PUBLICATIONS

Komatsu, "Pangya Official Guide Book", first edition, pp. 019-026, pp. 032-035, Dec. 5, 2005, Media Factory with partial translation.

* cited by examiner

*Primary Examiner* — Ronald Laneau
*Assistant Examiner* — Ross Williams
(74) *Attorney, Agent, or Firm* — Nixon & Vanderhye, P.C.

(57) ABSTRACT

A twist amount is calculated based on an angular velocity around a Z-axis of an input device when a player performs a shoot operation. Based on a value of a difficulty level stored in an external main memory, a minimum successful twist amount and a maximum successful twist amount are determined. As a result, the higher the difficulty level is, the narrower a successful range of the twist amount becomes. Further, the twist amount of the input device, which is obtained when the player performs the shoot operation for a first to a fourth shots, is stored in the external main memory. When the player performs the shoot operation for a fifth shot or thereafter, the twist amount of the input device at the time of the shoot operation for the fifth shot and thereafter is corrected with the use of the twist amount of the first to fourth shots.

15 Claims, 20 Drawing Sheets

F I G. 3
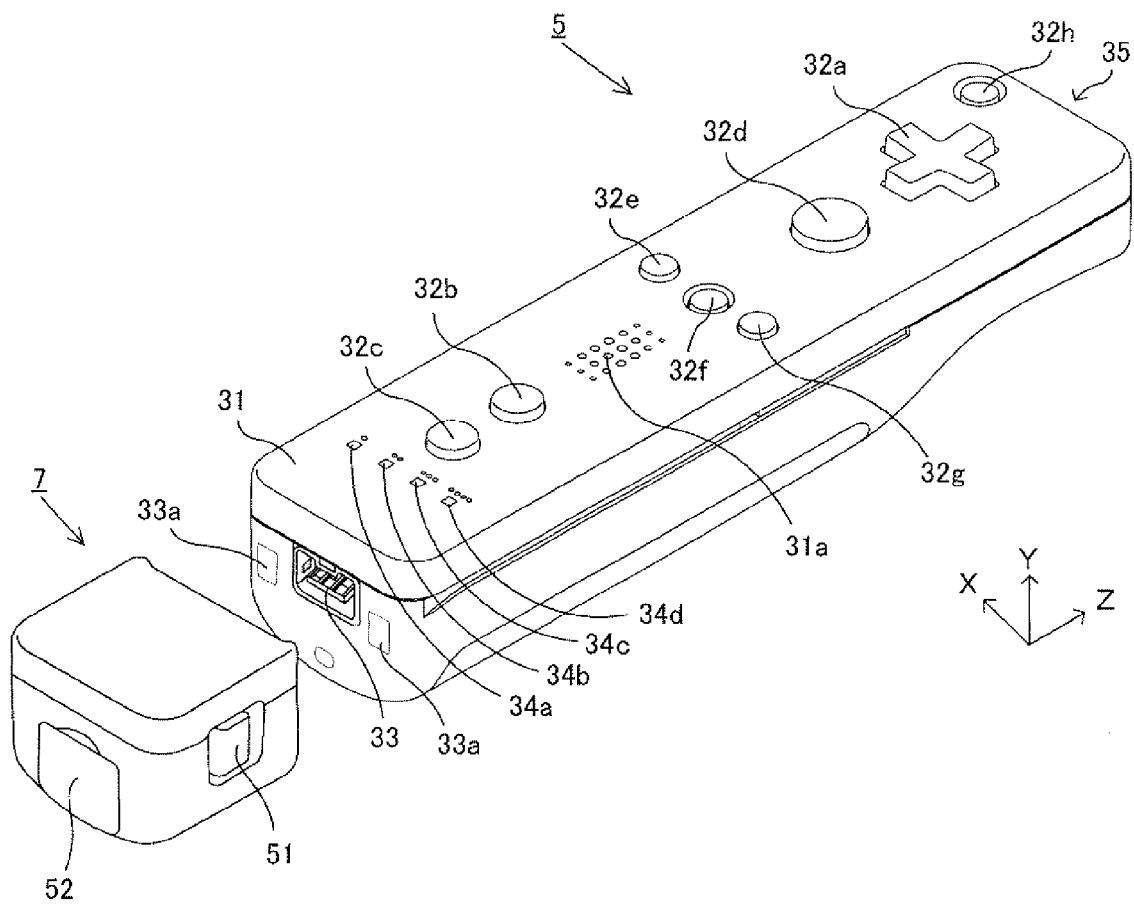

F I G. 1 3
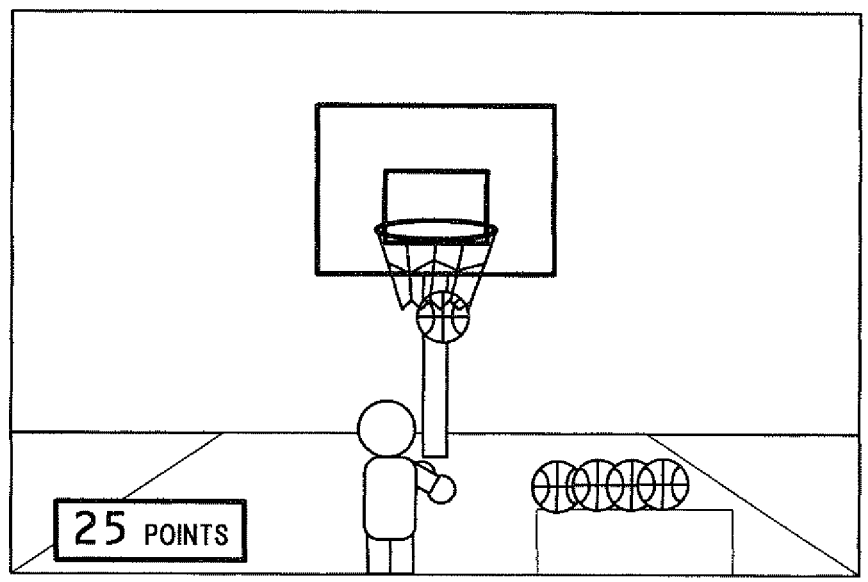

GAME APPARATUS AND COMPUTER-READABLE STORAGE MEDIUM

CROSS REFERENCE TO RELATED APPLICATION

The disclosure of Japanese Patent Application No. 2009-103230 and No. 2009-103231, filed Apr. 21, 2009, is incorporated herein by reference.

BACKGROUND OF THE INVENTION

1. Field of the Invention

The present invention relates to a game apparatus and a computer-readable storage medium, and more particularly to a game apparatus and a computer-readable storage medium for performing a game process in accordance with operation data, including angular velocity data, which is obtained from an angular velocity sensor provided to a controller.

2. Description of the Background Art

Conventionally, there has been a game apparatus for performing a game process in accordance with operation data, including an angular velocity, which is obtained from a gyro sensor provided to a controller. For example, in a game apparatus disclosed in Japanese Laid-Open Patent Publication No. 2000-308756, in accordance with information about an angular velocity, for example, obtained from a multiaxial gyro sensor provided to a controller, a motion of a sword held by a character in a virtual game space is controlled.

However, in the game apparatus disclosed in Japanese Laid-Open Patent Publication No. 2000-306756, in the game executed based on the angular velocity data obtained from the angular velocity sensor, it is not considered to set a difficulty level of the game, which makes the game monotonous. Additionally, as in the case of the game apparatus disclosed in Japanese Laid-Open Patent Publication No. 2000-308756, a game executed based on the angular velocity data obtained from the angular velocity sensor is largely affected by a player's behavior in moving his/her arm or wrist as compared to a conventional operation with a button switch. Thus, a problem is caused in that a game may be advantageous to some player, but may be disadvantage to the other.

SUMMARY OF THE INVENTION

Therefore, an object of the present invention is to provide a game apparatus and a computer-readable storage medium which are capable of adjusting a difficulty level of a game which is executed based on angular velocity data obtained from an angular velocity sensor. Further, another object of the present invention is to provide a game apparatus and a computer-readable storage medium which are capable of allowing a player to comfortably play a game which is executed based on angular velocity data obtained from an angular velocity sensor.

In embodiments of the present invention, the following configurations are applied to attain any of the objects mentioned above. Here, the reference numerals, figure numbers, the supplementary description and the like in the parentheses indicate an example of correspondence with the embodiment described below in order to aid in understanding the present invention and are not intended to limit, in any way, the scope of the present invention.

A game apparatus of the present invention is a game apparatus (3) performing a game process based on operation data (62) including angular velocity data obtained from an angular velocity sensor (55, 56) provided to a controller (8), and includes game process means (10), difficulty level setting means (10), and difficulty level control means (10).

The game process means executes a game based on the angular velocity data (FIGS. 9 to 13), and determines success or failure of the game in accordance with a value of the angular velocity data (S22, FIG. 21, S24, FIG. 22, S30, FIG. 25, FIG. 26).

The difficulty level setting means sets a difficulty level of the game (S32).

The difficulty level control means changes, in accordance with the difficulty level set by the difficulty level setting means, a successful range of the angular velocity data, the successful range in which the game is determined to be successful by the game process means (S29, FIGS. 23 to 26).

The higher the difficulty level set by the difficulty level setting means is, the narrower the successful range may be made by difficulty level control means.

Another game apparatus of the present invention is a game apparatus (3) performing a game process based on operation data (62) including angular velocity data obtained from an angular velocity sensor (55, 56) provided to a controller (8), and includes game process means (10), difficulty level setting means (10), and difficulty level control means (10).

The game process means executes a game in which a predetermined object (ball) is caused to move in a virtual game space in accordance with the angular velocity data (FIGS. 9 to 13).

The difficulty level setting means sets a difficulty level of the game (S32).

The difficulty level control means corrects, in accordance with the difficulty level set by the difficulty level setting means, the movement of the object caused by the game process means (S22, FIG. 21, S24, FIG. 22, S30, FIG. 25, FIG. 26).

The difficulty level control means may correct a movement control parameter (azimuth $\phi$) of the object, the movement control parameter being utilized by the game process means, so as to be approximated to a target value (0) or a target range ($\phi_1 \sim \phi_2$) of the movement control parameter, the target value or the target range being required in the game (FIG. 25, FIG. 26).

Further, the higher the difficulty level set by the difficulty level setting means is, the lesser a degree of correction may be performed on the movement control parameter by the difficulty level control means.

Further, the game process means may control the movement of the object based on the angular velocity data when the angular velocity data satisfies a predetermined condition.

Further, the game process means may control the movement of the object when the magnitude of an angular velocity (P) indicated by the angular velocity data reaches a local maximum and when a local maximum value of the angular velocity is greater than a predetermined threshold (throwing threshold) (S21).

Further, the game apparatus further includes angular velocity storage means (12) for sequentially storing the angular velocity data obtained from the angular velocity sensor. When the magnitude of an angular velocity (P) indicated by the angular velocity data reaches a local maximum, and when a local maximum value of the angular velocity is greater than the predetermined threshold (throwing threshold), the came process means may read, from the angular velocity storage means, pieces of angular velocity data obtained for a predetermined period of time before the angular velocity reaches the local maximum, and determine a moving direction (azimuth $\phi$) of the object in accordance with the pieces of angular velocity data. The difficulty level control means may correct the moving direction (azimuth φ) of the object, which is determined by the game process means, so as to be approximated to a target moving direction (0) of the object, the target moving direction being required in the game, to a degree corresponding to the difficulty level set by the difficulty level setting means.

Further, when the magnitude of an angular velocity (P) indicated by the angular velocity data reaches a local maximum, and when a local maximum value of the angular velocity is greater than the predetermined threshold (throwing threshold), the game process means may determine a moving velocity (initial speed V) and/or a reached distance of the object in accordance with the local maximum value. The difficulty level control means may correct the moving velocity and/or the reached distance of the object, which is determined by the game process means, so as to be approximated to a target moving velocity and/or a target reached distance of the object, the target moving velocity and/or a target reached distance being required in the game, to a degree corresponding to the difficulty level set by the difficulty level setting means.

Further, the difficulty level setting means may change the difficulty level of the game in accordance with the target reached distance (a distance between a target reached distance player character and a basketball ring) of the object required in the game (FIG. 30).

Further, the game process means may execute, multiple times, the game based on the angular velocity data (S17), and determine success or failure of the game in each of the multiple times. The difficulty level setting means may determine a reference difficulty level for a subsequent game in accordance with the success or failure of the game in each of the multiple times (S32), and determine the difficulty level of the subsequent game by adding a difficulty level offset (FIG. 30), which corresponds to the target reached distance of the object required in the game, to the reference difficulty level.

Further, when the magnitude of an angular velocity (P) indicated by the angular velocity data reaches a local maximum, and when a local maximum value of the angular velocity is greater than the predetermined threshold (throwing threshold), the game process means may set a moving direction (elevation angle θ) of the object in accordance with an orientation of the controller detected based on the angular velocity data obtained from the angular velocity sensor (S22). The difficulty level control means may correct the moving direction (elevation angle θ) of the object determined by the game process means so as to be approximated to a target moving direction of the object, the target moving direction being required in the game, to a degree corresponding to the difficulty level set by the difficulty level setting means.

Further, the game process means may execute, multiple times, the game based on the angular velocity data (S17), and determine the success or failure of the game in each of the multiple times. When a result of the game in a certain numberth time is determined to be successful, the difficulty level setting means may set the difficulty level of a subsequent game to be higher than the difficulty level of the game in the certain numberth time (FIGS. 27 to 29).

Further, the game process means may execute, multiple times, the game based on the angular velocity data (S17), and determine the success or failure of the game in each of the multiple times. When a result of the game in a certain numberth time is determined to have failed, the difficulty level setting means may set the difficulty level of a subsequent game to be lower than the difficulty level of the game in the certain numberth time (FIGS. 27 to 29).

Further, based on first angular velocity data obtained from a first angular velocity sensor provided to a first controller operated by a first player, and on second angular velocity data obtained from a second angular velocity sensor provided to a second controller operated by a second player, the game process means may execute a game in which the first player and the second player play a match, and determine success or failure of a first game operation by the first player and success or failure of a second game operation by the second player in accordance with values of the first angular velocity data and the second angular velocity data, respectively. The difficulty level setting means may set a difficulty level of the first game operation, and a difficulty level of the second game operation, individually. The difficulty level control means may change, in accordance with the difficulty level of the first game operation set by the difficulty level setting means, a successful range of the first angular velocity data, in which the first game operation is determined to be successful by the game process means, and also change, in accordance with the difficulty level of the second game operation set by the difficulty level setting means, a successful range of the second angular velocity data, in which the second game operation is determined to be successful by the game process means.

Further, the difficulty level setting means may set the difficulty level of a subsequent game in accordance with the success or failure of the first game operation in a certain numberth time, and also set a difficulty level of a subsequent game in accordance with the success or failure of the second game operation in a certain numberth time.

A computer-readable storage medium of the present invention is a computer-readable storage medium having stored thereon a game program causing a computer (10) of a game program (3), which executes a game process, based on operation data (62) including angular velocity data obtained from an angular velocity sensor (55, 56) provided to a controller (8), to function as computer game process means, difficulty level setting means, and difficulty level control means.

The game process means executes a game based on the angular velocity data (FIGS. 9 to 13), and determines success or failure of the game in accordance with a value of the angular velocity data.

The difficulty level setting means sets a difficulty level of the game (S32).

The difficulty level control means changes, in accordance with the difficulty level set by the difficulty level setting means, a successful range of the angular velocity data, the successful range in which the game is determined to be successful by the game process means (S29, FIGS. 23 to 26).

Another game program of the present invention is a game program for causing computer (10) of a game apparatus (3), which executes a game process, based on operation data (62) including angular velocity data obtained from an angular velocity sensor (55, 56) provided to a controller (8), to function as game process means, difficulty level setting means, and difficulty level control means.

The game process means executes a game in which a predetermined object (ball) is caused to move in a virtual game space in accordance with the angular velocity data (FIGS. 9 to 13).

The difficulty level setting means sets a difficulty level of the game (S32).

The difficulty level control means corrects, in accordance with the difficulty level set by the difficulty level setting means, the movement of the object caused by the game process means (S22, FIG. 21, S24, FIG. 22, S30, FIG. 25, FIG. 26).

Another game apparatus (3) of the present invention: is a game apparatus executing, multiple times, a game for causing a player to perform a predetermined game operation (shoot operation) using a controller (8) provided with an angular velocity sensor (55, 56), and performing a game process based on operation data (62) including angular velocity data, which is obtained from the angular velocity sensor each time the predetermined game operation is performed; and includes parameter value determination means (10), deviation tendency value calculation means (10), and game process means (10).

The parameter value determination means determines a value of a predetermined parameter (twist amount R) in accordance with the angular velocity data obtained from the angular velocity sensor each time the predetermined game operation is performed (S25).

The deviation tendency value calculation means calculates a deviation tendency value (an average value of a "twist amount R1 of a first shot" to a "twist amount R4 of a fourth shot"), which indicates a degree of deviation tendency of a value of the parameter with respect to a target value of the parameter ("0"), the target value being required in the game, in accordance with the value of the parameter (the twist amount R1 of the first shot" to the "twist amount R4 the fourth shot") determined based on the predetermined game operation performed once or more in the past (S27).

The game process means corrects the value of the parameter determined by the parameter value determination means with the use of the deviation tendency value calculated by the deviation tendency value calculation means (S27) and performs the game process with the use of the corrected value of the parameter (S30).

The deviation tendency value calculation means may calculate the deviation tendency value based on the value of the parameter determined by the parameter value determination means in accordance with the predetermined game operation (shoot operation for the first to fourth shots) performed multiple times in the past.

Further, the deviation tendency value calculation means may calculate, as the deviation tendency value, a representative value (average value, weighted average value, mode valuer median value) of a difference between the value of the parameter, which is determined by the parameter value determination means in accordance with the predetermined game operation performed multiple times in the past, and the target value.

Further, the representative value may be an average value.

Further, the deviation tendency value calculation means may correct the value of the parameter by subtracting the deviation tendency value calculated by the deviation tendency value calculation means from the value of the parameter determined by the parameter value determination means.

Further, the game process means may perform the game process with the use of the value of the parameter determined by the parameter value determination means, without correcting the value of the parameter with the deviation tendency value, when the deviation tendency value is yet to be calculated by the deviation tendency value calculation means.

Further, the game process means may include judging means which judges that the game operation is successful when the difference between the value of the parameter and the target value is in a predetermined range (successful range, FIG. 25).

Further, the parameter value determination means may determine that the predetermined game operation has been performed when the angular velocity data satisfies a predetermined condition (S21), and determine the value of the parameter in accordance with the angular velocity data obtained from the angular velocity sensor.

Further, the predetermined condition may be that the magnitude of an angular velocity (swing strength P) indicated by the angular velocity data reaches a local maximum, and that a local maximum value of the angular velocity is greater than a predetermined threshold (throwing threshold) (S21).

Further, angular velocity storage means (12) for sequentially storing the angular velocity data obtained from the angular velocity sensor may be further included. When the magnitude of an angular velocity indicated by the angular velocity data reaches a local maximum, and when a local maximum value of the angular velocity is greater than the predetermined threshold, the parameter value determination means may read, from the angular velocity storage means, a piece of angular velocity data obtained for a predetermined period before the angular velocity reaches the local maximum (angular velocity data of most recent several samples) and detect an angular velocity around a predetermined axis (Z-axis) of the controller in accordance with the piece of angular velocity data, and determine the detected angular velocity (twist amount R) around the predetermined axis of the controller, as the value of the parameter. The game process means may change a moving direction (azimuth $\phi$) of a predetermined object (ball) in a virtual game space, in accordance with the angular velocity around the predetermined axis of the controller, the angular velocity having been subjected to correction with the use of the deviation tendency value.

Further, when the magnitude of an angular velocity indicated by the angular velocity data reaches a local maximum, and when a local maximum value of the angular velocity is greater than the predetermined threshold, the parameter value determination means may determine the value of the local maximum (local maximum value of swing strength P) as the value of the parameter. The game process means may change a moving velocity (initial velocity V) and/or a reached distance of a predetermined object (ball) in a virtual game space in accordance with the local maximum value having been subjected to correction with the use of the deviation tendency value.

Further, when the magnitude of an angular velocity indicated by the angular velocity data reaches a local maximum, and when a local maximum value of the angular velocity is greater than the predetermined threshold, the parameter value determination means may determine, as the value of the parameter, an orientation of the controller (orientation in the pitch direction of the controller 5) detected based on the angular velocity data obtained from the angular velocity sensor. The game process means may change a moving direction (elevation angle $\theta$) of a predetermined object (ball) in a virtual game space, in accordance with the orientation of the controller after being subjected to correction with the use of the deviation tendency value.

Another computer-readable storage medium of the present invention is a computer-readable storage medium having stored thereon a game program (61) for causing a computer (10) of a game apparatus (3), which executes, multiple times, a game for causing a player to perform a predetermined game operation (shoot operation) using a controller (8) provided with an angular velocity sensor (55, 56), and which performs a game process based on operation data (62) including angular velocity data obtained from the angular velocity sensor each time the predetermined game operation is performed, to function as parameter value determination means, deviation tendency value calculation means, and game process means.

The parameter value determination means determines a value of a predetermined parameter (twist amount R) in accordance with the angular velocity data obtained from the angular velocity sensor each time the predetermined game operation is performed (S25).

The deviation tendency value calculation means calculates a deviation tendency value (an average value of a "twist amount R1 of a first shot" to a "twist amount R4 of a fourth shot"), which indicates a degree of deviation tendency of a value of the parameter, which is determined by the parameter value determination means in accordance with the predetermined game operation, with respect to a target value ("0") of the parameter, the target value being required in the game, in accordance with the value of the parameter ("twist amount R1 of the first shot" to "twist amount R4 of the fourth shot") determined, by the parameter value determination means in accordance with the predetermined game operation performed once or more in the past (S27).

The game process means corrects the value of the parameter determined by the parameter value determination means with the use of the deviation tendency value calculated by the deviation tendency value calculation means (S27), and performs the game process with the use of the corrected value of the parameter (S30).

According to the present invention, it is possible to provide a game apparatus and a computer readable storage medium, which are capable of setting the difficulty level of a game, in a game that is executed based on the angular velocity data obtained from the angular velocity sensor, and also possible to provide a game apparatus and a computer readable storage medium which are capable of allowing a player to comfortably play a game.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a perspective view illustrating an external structure of an input device;
FIG. 13 is an exemplary game imaged displayed on the screen of the television 2.

DESCRIPTION OF THE PREFERRED EMBODIMENTS

Entire Configuration of Game System

Figure 1:
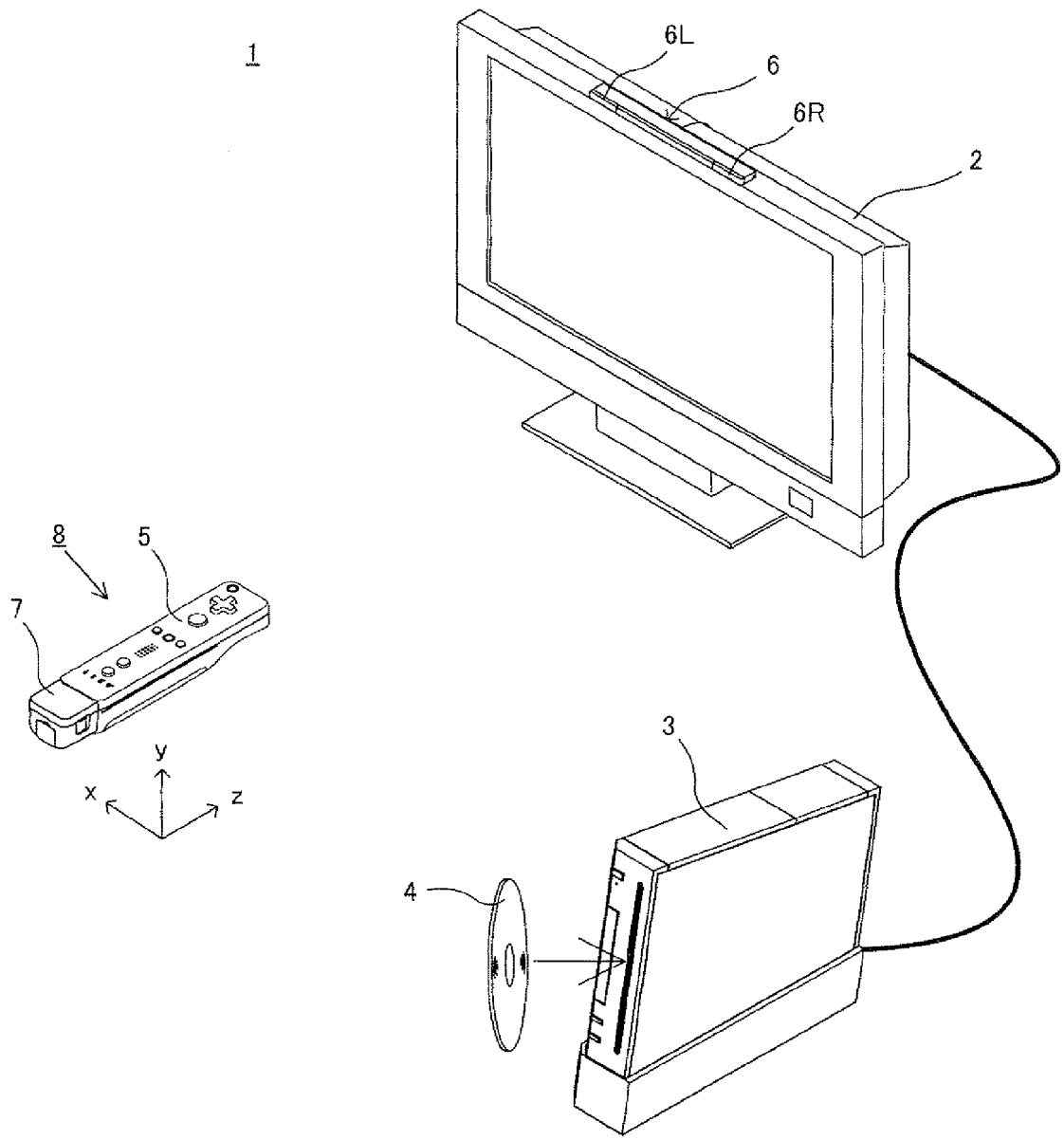
FIG. 1 is an external view of a game system.

With reference to FIG. 1, a game system 1 including a game apparatus according to an embodiment of the present invention will be described. FIG. 1 is an external view of the game system 1. In the following description, a stationary game apparatus is taken as an example for describing a game apparatus and a game program of the present embodiment. As shown in FIG. 1, the game system 1 includes a television receiver (hereinafter, simply referred to as a "television") 2, a game apparatus 3, an optical disc 4, an input device 8, and a marker section 6. In this system, the game apparatus 3 performs game process based on a game operation using the input device 8.

In the game apparatus 3, the optical disc 4 typifying an information storage medium used for the game apparatus 3 in an exchangeable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process.

The game apparatus 3 is connected to the television 2, which is an exemplary display device, via a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LED, and emits an infrared light forward from the television 2. The marker section 6 is connected to the game apparatus 3, and the game apparatus 3 is able to control each infrared LED of the marker section 6 so as to light each infrared LED up.

The input device 8 provides the game apparatus 3 with operation data representing a content of an operation performed on the input device 8 itself. In the present embodiment, the input device 8 includes a controller 5 and a gyro sensor unit 7. As described in detail below, the input device 8 is structured such that the gyro sensor unit 7 is detachably connected to the controller 5. Radio communication is made between the controller 5 and the game apparatus 3. In the present embodiment, the radio communication between the controller 5 and the game apparatus 3 is made by using, for example, the Bluetooth (Registered Trademark) technology. In another embodiment, connection between the controller 5 and the game apparatus 3 may be a wired connection.

[Internal Structure of Game Apparatus 3]

Figure 2:
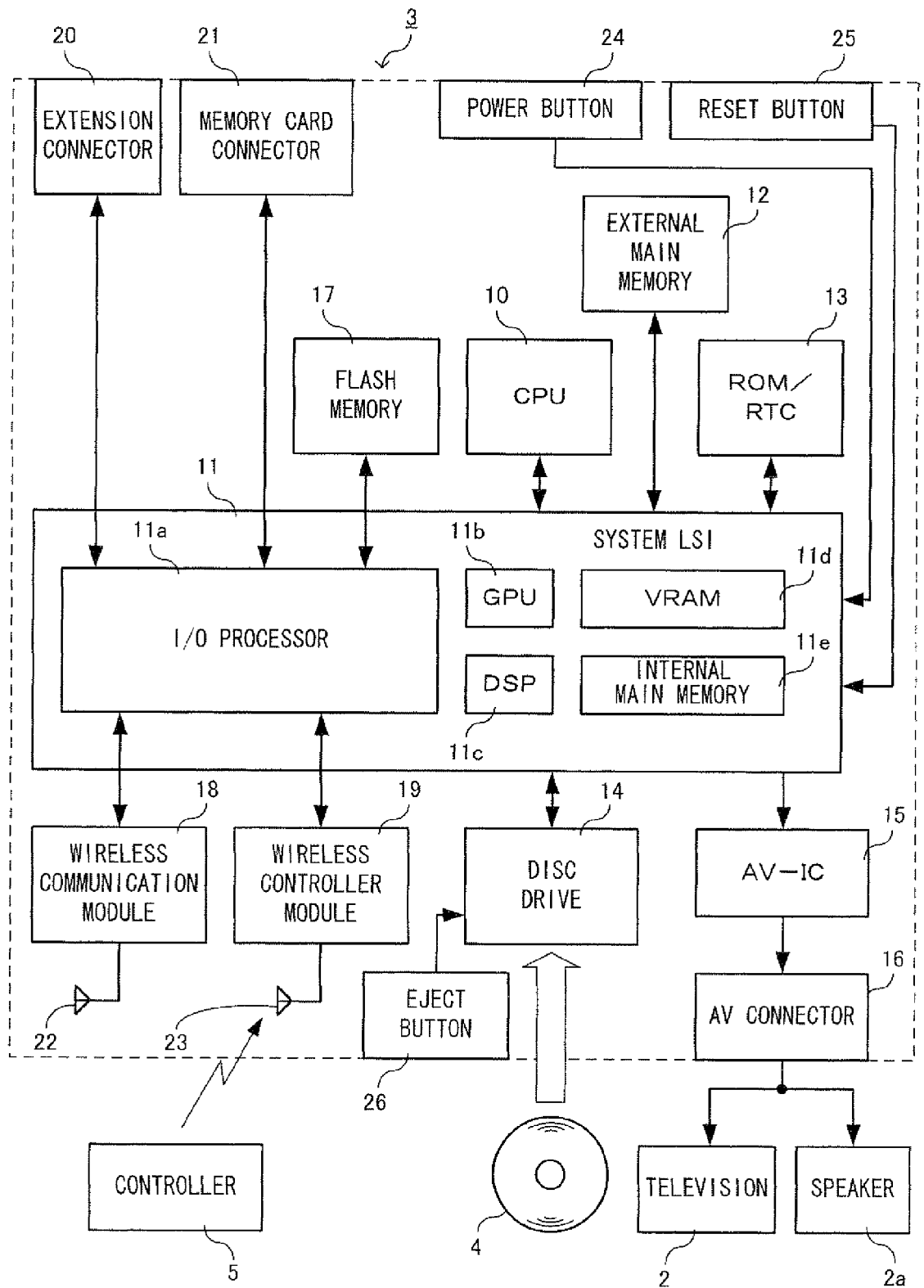
FIG. 2 is a functional block diagram of a game apparatus.

Next, an internal structure of the game apparatus 3 will be described with reference to FIG. 2. FIG. 2 is a block diagram illustrating a structure of the game apparatus 3. The game apparatus 3 includes the CPU 10, a system LSI 11, an external main memory 12, a ROM/RTC 13, a disk drive 14, an AV-IC 15, and the like.

The CPU 10, functioning as a game processor, performs a game process by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI 11 will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (so-called a boot ROM) incorporating a boot program for the game apparatus 3, and a clock circuit (RTC: Real Time Clock) for counting a time. The disk drive 14 reads program data, texture data, and the like from the optical disc 4, and writes the read data into an internal main memory 11e or the external main memory 12 described below.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data by using data stored in the VRAM 11d.

The DSP 11c, functioning as an audio processor, generates audio data by using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the component connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects data, if any, which needs to be transmitted to the network, and transmits, when the data is detected, the data to the network through the wireless communication module 18 and the antenna 22. Further, the input/output processor 11a receives data transmitted from another game apparatus, and/or download data from a download server, through the network, the antenna 22, and the wireless communication module 18, and stores the received data and/or the downloaded data in the flash memory 17. The CPU 10 executes a game program so as to read data stored in the flash memory 17 and use the data on the game program. The flash memory 17 may store saved data (game result data or intermediate step data) of a game played by using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data in a buffer area of the internal main memory 11e or the external main memory 12.

Further, the input/output processor 11a is connected to the extension connector 20 and the memory card connector 21. The extension connector 20 is a connector for interface, such as a USB or a SCSI, and allows communication with the network by connecting thereto a media such as an external storage media, connecting thereto a peripheral device such as another controller, and/or connecting thereto a wired communication connector, without using the wireless communication module 18. The memory card connector 21 is a connector for connecting thereto an external storage media such as a memory card. For example, the input/output processor 11a accesses an external storage media through the extension connector 20 or the memory card connector 21 so as to store data in the external storage media or read data from the external storage media.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disk drive 14. When the eject button 26 is pressed, the optical disc 4 is ejected from the disk drive 14.

[Structure of Input Device 8]

Figure 4:
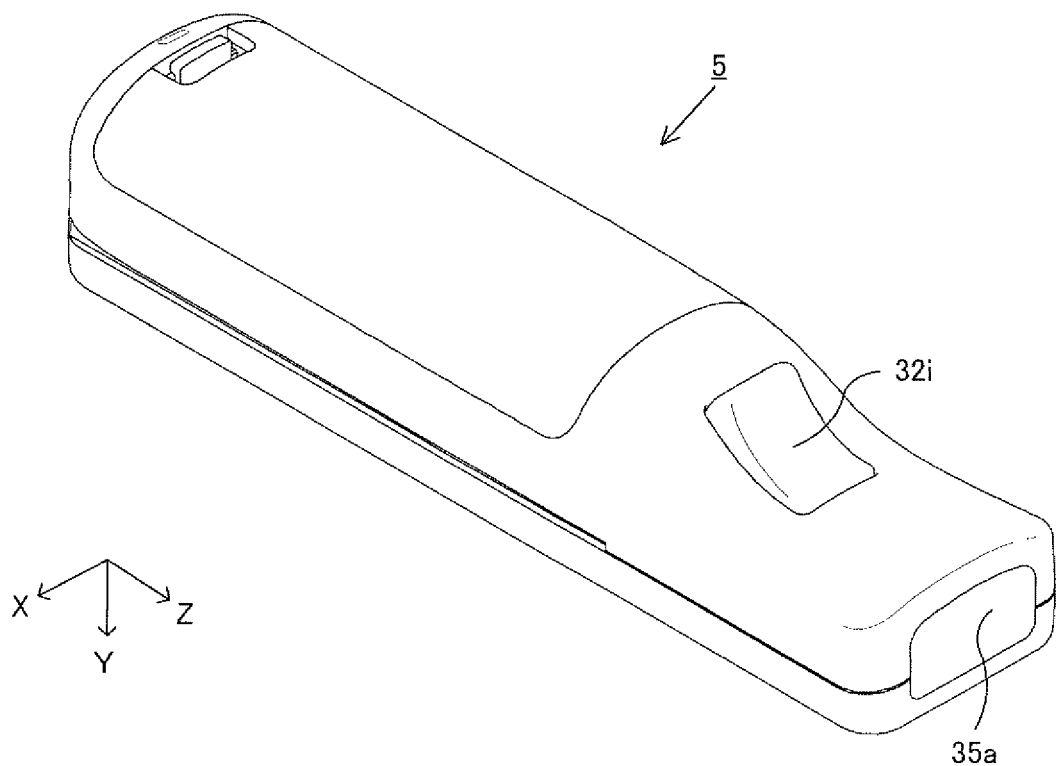
FIG. 4 is a perspective view illustrating an external structure of a controller.

Next, with reference to FIGS. 3 to 6, the input device 8 will be described. FIG. 3 is a perspective view illustrating an external structure of an input device B. FIG. 4 is a perspective view illustrating an external structure of the controller 5. FIG. 3 is a perspective view illustrating the controller 5 as viewed from the top rear side thereof, and FIG. 4 is a perspective view illustrating the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and the entire housing 31 has such a size as to be able to be held by one hand of an adult or even a child. A player is allowed to perform game operation by pressing buttons provided on the controller 5, and moving the controller 5 so as to change the position and the orientation thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. On the other hand, as shown in FIG. 4, a recessed portion is formed on a bottom surface of the housing 31, and a B button 32i is provided on a rear slope surface of the recessed portion. The operation buttons 32a to 32i are assigned, as necessary, with respective functions in accordance with the game program executed by the game apparatus 3. Further, the power button 32h remote-controls the power of a body of the game apparatus 3 to be on or off. The home button 32f and the power button 32h each has the top surface thereof buried in the top surface of the housing 31. Therefore, the home button 32f and the power button 32h are prevented from being inadvertently pressed by the player.

On a rear surface of the housing 31, the connector 33 is provided. The connector 33 is used for connecting the controller 5 to another device (for example, the gyro sensor unit 7 or another controller). Both side surfaces of the connector 33 provided on the rear surface of the housing 31 each has a locking hole 33a for preventing easy removal of another device as described above.

In the rear portion on the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing a player of the controller type which is currently set to controller 5 that he/she is using, and for informing a player of remaining battery power of the controller 5, for example. Specifically, when a game operation is performed by using the controller 5, one of the plurality of LEDs 34a, 34b, 34c, and 34d corresponding to the controller type is lit up.

The controller 5 has an imaging information calculation section 35 (FIG. 7), and a light incident surface 35a of the imaging information calculation section 35 is provided on the front surface of the housing 31, as shown in FIG. 4. The light incident surface 35a is made of material passing therethrough at least infrared light outputted from the markers 6R and 6L.

On the top surface of the housing 31, a sound hole 31a for externally outputting a sound from a speaker 49 (shown in FIG. 5) which is incorporated in the controller 5 is provided between the first button 32b and the home button 32f.

Figure 5:
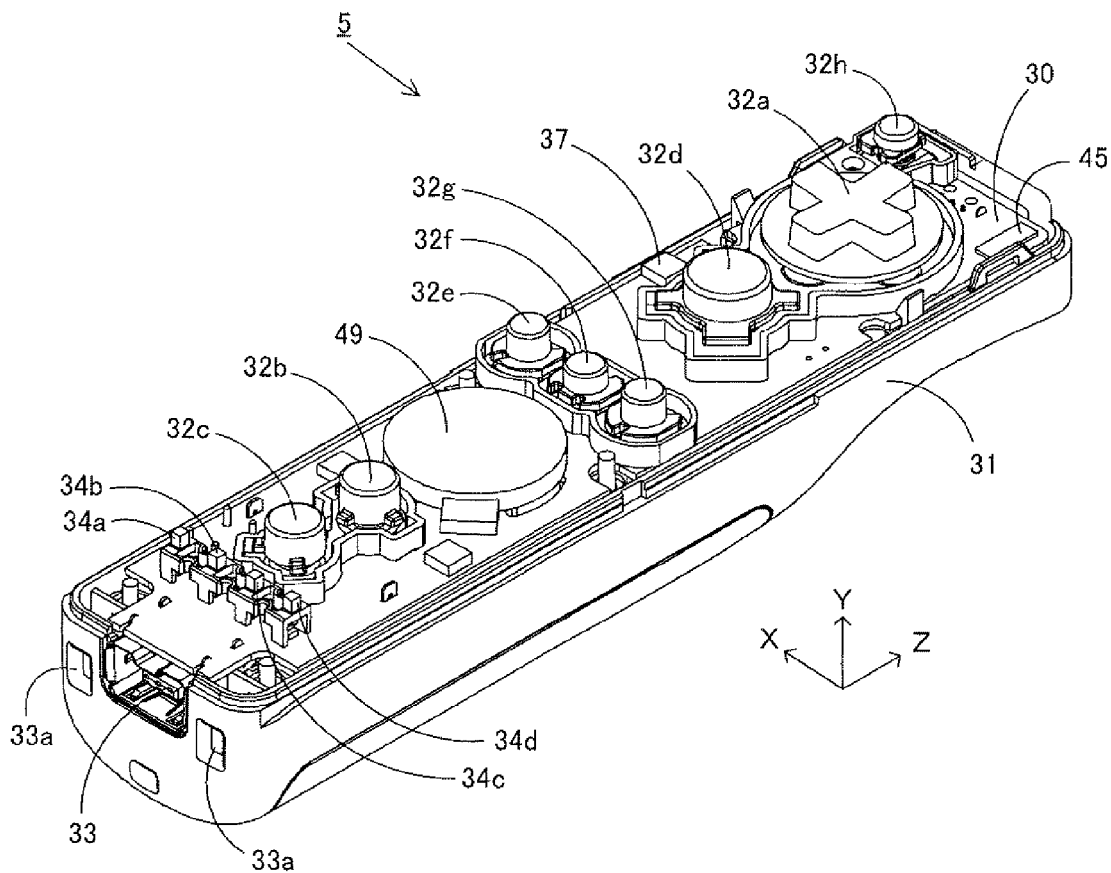
FIG. 5 is a diagram illustrating an internal structure of the controller.
Figure 6:
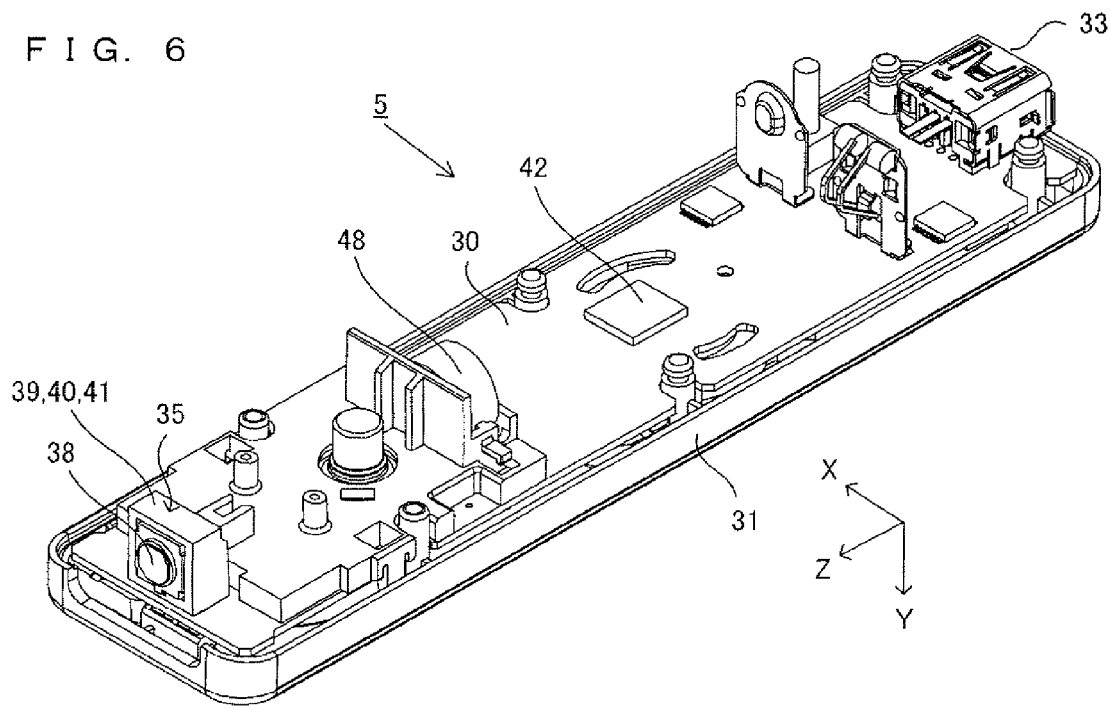
FIG. 6 is a diagram illustrating an internal structure of the controller.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. FIG. 6 is a perspective view illustrating a reverse side of a substrate 30 shown in FIG. 5.

As shown in FIG. 5, the substrate 30 is fixed inside the housing 31, and on a top main surface of the substrate 30, the operation buttons 32a to 32h, the LEDs 34a to 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided in front of the center of the controller 5 with respect to the longitudinal direction (Z-axis direction). Further, a wireless module 44 (see FIG. 7) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, the image pickup element 40 and an image processing circuit 41 located in order, respectively, from the front surface of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by an actuation of the vibrator 48 based on a command from the microcomputer 42. Therefore, the vibration is conveyed to the player's hand holding the controller 5, and thus a so-called vibration-responsive game is realized. In the present embodiment, the vibrator 48 is disposed slightly toward the front of the housing 31. That is, the vibrator 48 is positioned at the end portion of the controller 5 offset from the center thereof, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyro sensor unit 7 includes a gyro sensor (gyro sensors 55 and 56 shown in FIG. 7) for detecting for angular velocities around three axes, respectively. The gyro sensor unit 7 is detachably mounted to the connector 33 of the controller 5. The gyro sensor unit 7 has, at the front edge (an edge portion facing toward the Z-axis positive direction shown in FIG. 3), a plug (a plug 53 shown in FIG. 7) connectable to the connector 33. Further, the plug 53 has hooks (not shown) on both sides, respectively. In a state where the gyro sensor unit 7 is mounted to the controller 5, the plug 53 is connected to the connector 33, and the hooks engage in the locking holes 33a, respectively, of the controller 5. Therefore, the controller 5 and the gyro sensor unit 7 are securely fixed to each other. Further, the gyro sensor unit 7 has a button 51 on each side surface (surfaces facing toward the X-axis direction shown in FIG. 3). When the buttons 51 are pressed, the hooks are disengaged from the locking holes 33a. Therefore, when the plug 53 is removed from the connector 33 while the buttons 51 are being pressed, the gyro sensor unit 7 can be disconnected from the controller 5.

Further, a connector having the same shape as the connector 33 is provided at the rear edge of the gyro sensor unit 7. Therefore, another device which can be mounted to (the connector 33 of) the controller 5 can be mounted to the connector of the gyro sensor unit 7. In FIG. 3, a cover 52 is detachably provided over the connector.

FIGS. 3 to 6 each shows only examples of a shape of each of the controller 5 and the gyro sensor unit 7, a shape of each operation button, the number of acceleration sensors, the number of vibrators, fixing positions of the acceleration sensor and the vibrator, respectively, and the like. Other shapes, numbers, and fixing positions may be applicable. Further, although in the present embodiment the imaging direction of the image pickup means is Z-axis positive direction, the imaging direction may be any direction. That is, the imagining information calculation section 35 (the light incident surface 35a of the imaging information calculation section 35) of the controller 5 may not be provided on the front surface of the housing 31, but may be provided on any other surface on which a light can be received from the outside of the housing 31.

Figure 7:
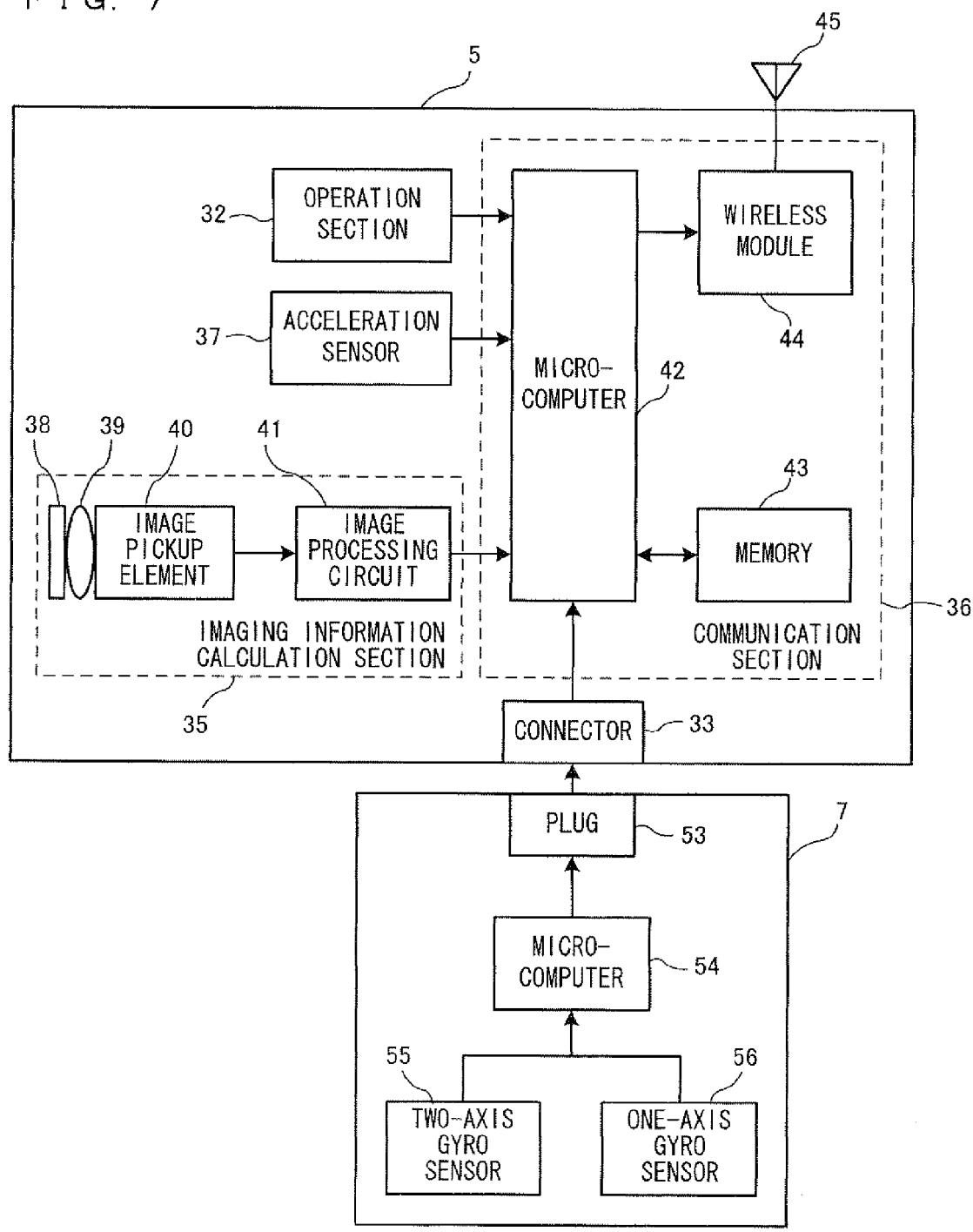
FIG. 7 is a block diagram illustrating a configuration of the input device.

FIG. 7 is a block diagram illustrating a structure of the input device 8 (the controller 5 and the gyro sensor unit 7). The controller 5 includes an operation section 32 (the respective operation buttons 32a to 32i), the connector 33, the imaging information calculation section 35, a communication section 36, and the acceleration sensor 37. The controller 5 transmits, as operation data, data representing a content of operation performed on the controller 5 itself, to the game apparatus 3.

The operation section 32 includes the operation buttons 32a to 32i described above, and outputs, to the microcomputer 42 of a communication section 36, operation button data indicating an input state (that is, whether or not each operation button 32a to 32i is pressed) of each operation button 32a to 32i.

The imaging information calculation section 35 is a system for analyzing image data taken by the image pickup means and calculating the centroid, the size and the like of an area having a high brightness in the image data. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 allows only infrared light to pass therethrough, among light incident on the front surface of the controller 5. The lens 39 collects the infrared light which has passed through the infrared filter 38 so as to be incident on the image pickup element 40. The image pickup element 40 is a solid-state imaging device such as, for example, a CMOS sensor or a CCD sensor, and receives the infrared light collected by the lens 39, and outputs an image signal. The markers 6R and 6L of the marker section 6 provided near the display screen of the television 2 each includes an infrared LED for outputting infrared light forward from the television 2. Therefore, the infrared filter 38 enables the image pickup element 40 to receive only the infrared tight which has passed through the infrared filter 38 and generate image data, so that an image of each of the markers 6R and 6L can be captured with enhanced accuracy. Hereinafter, the image captured by the image pickup element 40 is referred to as a pickup image. The image data generated by the image pickup element 40 is processed by the image processing circuit 41. The image processing circuit 41 calculates, in the pickup image, a position of an imaging subject (the marker 6R and the marker 6L). The image processing circuit 41 outputs data representing a coordinate point of the calculated position, to the microcomputer 42 of the communication section 36. The data representing the coordinate point is transmitted as operation data to the game apparatus 3 by the microcomputer 42. Hereinafter, the coordinate point is referred to as a "marker coordinate point". The marker coordinate point changes depending on an orientation (angle of tilt) and/or a position of the controller 5 itself, and therefore the game apparatus 3 is allowed to calculate the orientation and the position of the controller 5 by using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects for an acceleration (including gravitational acceleration) of the controller 5, that is, detects for a force (including gravity) applied to the controller 5. The acceleration sensor 37 detects a value of an acceleration (linear acceleration) in the straight line direction along the sensing axis direction, among accelerations applied to a detection section of the acceleration sensor 37. For example, multiaxial acceleration sensor having two or more axes detects an acceleration of a component for each axis, as an acceleration applied to the detection section of the acceleration sensor. For example, three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration for the straight line direction along each axis, and an output from the acceleration sensor 37 represents a value of the linear acceleration for each of the three axes. In other words, the detected acceleration is represented as a three-dimensional vector (ax, ay, az) in an XYZ-coordinate system (controller coordinate system) defined relative to the input device 8 (controller 5). Hereinafter, a vector representing components of the acceleration values detected for the three axes, respectively, by the acceleration sensor 37 is referred to as an acceleration vector.

Data (acceleration data) representing an acceleration detected by the acceleration sensor 37 is outputted to the communication section 36. The acceleration detected by the acceleration sensor 37 changes depending on an orientation (angle of tilt) and a movement of the controller 5, and therefore the game apparatus 3 is allowed to calculate the orientation and the movement of the controller 5 by using the acceleration data. In the present embodiment, the game apparatus 3 determines the orientation of the input device 8 (controller 5) based on the acceleration data and angular velocity data which is described below. The orientation of the input device is, for example, represented by a coordinate value on the xyz-coordinate system which is based on a predetermined position in a space in which the input device is present. Here, as shown in FIG. 1, the xyz-coordinate system is based on the precondition that the input device 8 is situated in front of the marker section 6. A direction from the position of the input device 8 to the marker section 6 is set as a z-axis positive direction, a vertically upward direction (a direction opposite to the gravity direction) is set as a y-axis positive direction, and a direction to the left when the marker section 6 is viewed from the position of the input device 8 is set as an x-axis positive direction. Further, the orientation of the input device in a situation where the X-axis, the Y-axis, and the Z-axis, which is defined based on the input device 8 (controller 5) coincide with the x-axis, the y-axis, and the z-axis, respectively, is referred to a reference orientation. The orientation of the input device 8 is represented as an orientation on the xyz-system in the case where the input device 8 is rotated from the reference orientation in a roll direction (around the Z-axis), a pitch direction (around the X-axis), and a yaw direction (around the Y-axis) while the Z-axis is set as the reference. The orientation is expressed by a rotation matrix M described later.

The data (acceleration data) representing the acceleration (acceleration vector) detected by the acceleration sensor 37 is outputted to the communication section 36.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, suppose a case where the computer performs a process, based on the precondition that the controller 5 including the accelerate sensor 37 is in a static state (that is, a case where a process is performed based on the precondition that an acceleration detected by the acceleration sensor will include only a gravitational acceleration). When the controller 5 is actually in the static state, it is possible to determine whether or not the controller 5 tilts relative to the direction of gravity and to also determine a degree of the tilt, based on the acceleration having been detected. Specifically, when a state where a detection axis of the acceleration sensor 37 is toward the vertically downward direction represents a reference, whether or not the controller 5 tilts relative to the reference can be determined based on whether or not 1 G (gravitational acceleration) is applied to the detection axis, and a degree to which the controller 5 tilts relative to the reference can be determined based on the magnitude of the gravitational acceleration. Further, the multiaxial acceleration sensor 37 subjects, to a processing, the acceleration signals having been detected in the respective axes so as to more specifically determine the degree to which the controller 5 tilts relative to the direction of gravity. In this case, the processor may calculate, based on the output from the acceleration sensor 37, an angle of the tilt at which the controller 5 tilts, or calculate direction in which the controller 5 tilts without calculating the angle of the tilt. Thus, when the acceleration sensor 37 is used in combination with the processor, an angle of tilt or an orientation of the controller 5 may be determined.

On the other hand, in a case where it is anticipated that the controller 5 will be in a dynamic state (a state where the controller 5 is being moved), the acceleration sensor 37 detects an acceleration based on a movement of the controller 5, in addition to the gravitational acceleration. Therefore, when the gravitational acceleration component is eliminated from the detected acceleration through a predetermined process, it is possible to determine a direction in which the controller 5 moves. Even when it is anticipated that the controller 5 will be in the dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing, before outputting to the microcomputer 42 an acceleration signal detected by the acceleration detection means incorporated therein, any desired processing of the acceleration signal. For example, when the acceleration sensor 37 is intended to detect static acceleration (for example, gravitational acceleration), the embedded or dedicated processor could convert the acceleration signal to a corresponding angle of tilt (or another preferable parameter)

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyro sensor unit 7 is inputted to the microcomputer 42 through the connector 33. Hereinafter, a structure of the gyro sensor unit 7 will be described.

The gyro sensor unit 7 includes the plug 53, a microcomputer 54, the two-axis gyro sensor 55, and the one-axis gyro sensor 56. As described above, the gyro sensor unit 7 detects angular velocities around three axes (XYZ axes in the present embodiment), respectively, and transmits data (angular velocity data) representing the detected angular velocities, to the controller 5.

The two-axis gyro sensor 55 detects an angular velocity (per unit time) around each of the X-axis and the Y-axis. Further, the one-axis gyro sensor 56 detects an angular velocity (per unit time) around the Z-axis. In the present invention, directions of the rotations around the Z-axis, the X-axis, and the Y-axis relative to the imaging direction (the Z-axis positive direction) of the controller 5 are referred to as a roll direction, a pitch direction, and a yaw direction, respectively. That is, the two-axis gyro sensor 55 detects angular velocities in the pitch direction (direction of rotation around the X-axis) and the yaw direction (direction of rotation around the Y-axis), and the one-axis gyro sensor 56 detects an angular velocity in the roll direction (the direction of rotation around the Z-axis).

In the present embodiment, the two-axis gyro sensor 55 and the one-axis gyro sensor 56 are used so as to detect the angular velocities around the three axes. However, in another embodiment, the number of gyro sensors and a combination thereof to be used may be optionally selected provided that the angular velocities around the three axes can be detected.

Further, in the present embodiment, the three axes around which the gyro sensors 55 and 56 detect the angular velocities are set to correspond to three axes (XYZ-axes), respectively, for which the acceleration sensor 37 detects the accelerations. However, in another embodiment, the three axes around which the gyro sensors 55 and 56 detect the angular velocities need not correspond to the three axes for which the acceleration sensor 37 detects the accelerations.

Data representing the angular velocities detected by the gyro sensors 55 and 56 are outputted to the microcomputer

54. Therefore, data representing the angular velocities around the three axes of the X, Y, and Z axes are inputted to the microcomputer 54. The microcomputer 54 transmits the data representing the angular velocities around the three axes, as angular velocity data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission is preferably performed at a cycle shorter than a cycle of 1/60 seconds.

The controller 5 will be described again. Data outputted from the operation section 32, the imaging information calculation section 35, and the acceleration sensor 37 to the microcomputer 42, and data transmitted from the gyro sensor unit 7 to the microcomputer 42 are temporarily stored in the memory 43. The data are transmitted as the operation data to the game apparatus 3. At a timing of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

When the controller 5 is used, a player is allowed not only to perform a conventional typical game operation of pressing the respective operation buttons, but also to perform an operation of tilting the controller 5 at a desired angle of tilt. Other than these operations, by using the controller 5, a player is allowed to perform an operation of designating a desired position on a screen, or perform an operation of moving the controller 5 itself.

[Outline of Game Process]

Next, with reference to FIGS. 8 to 13, an outline of a basketball game process executed on the above game system 1 will be described. In a basketball game executed in the present embodiment, a player character being present in a virtual game space repeats shooting of a basketball a predetermined number of times in accordance with an operation performed by a player, and the player is provided with scores in accordance with success or failure of the shooting. When a player performs a swing operation as shown in FIG. 8, the player character is caused to perform shooting of a basketball.

Figure 9:
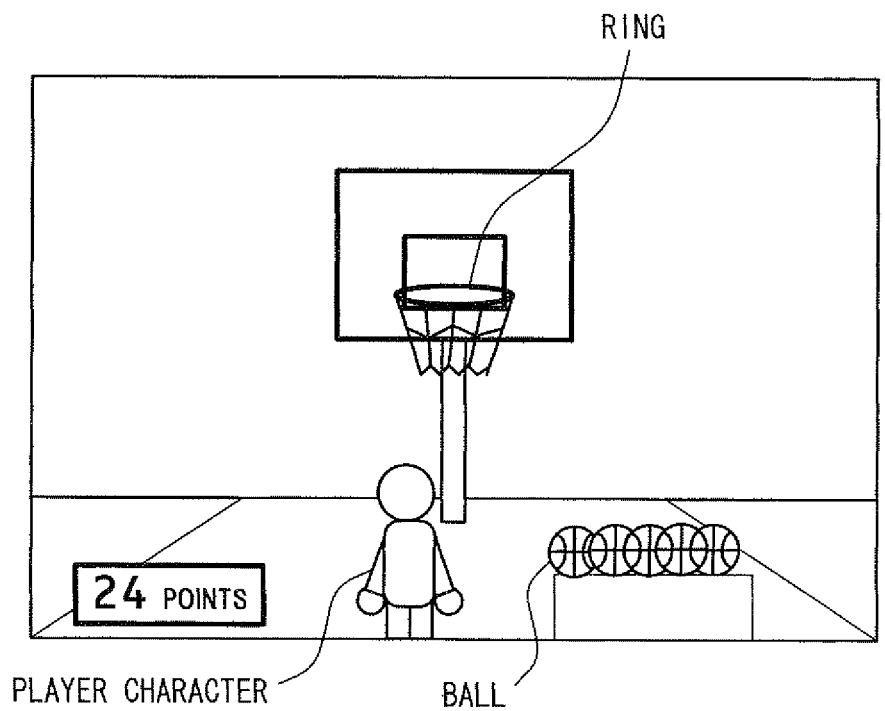
FIG. 9 is an exemplary game image displayed on a screen of a television 2.

FIG. 9 illustrates an exemplary game image displayed on a screen of the television 2 immediately after a game is started. The game image shows a scene of a virtual game space as viewed from a predetermined view point (virtual camera), and the game image shows a player character, a ball, a basketball ring and the like situated in the virtual game space. Additionally, the game image displays scores of a player.

Figure 10:
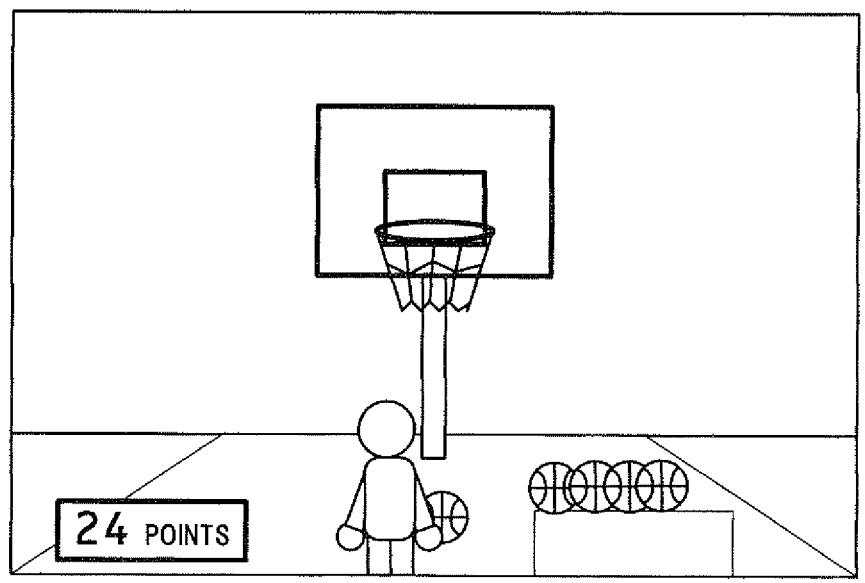
FIG. 10 is an exemplary game image displayed on the screen of the television 2.
Figure 11:
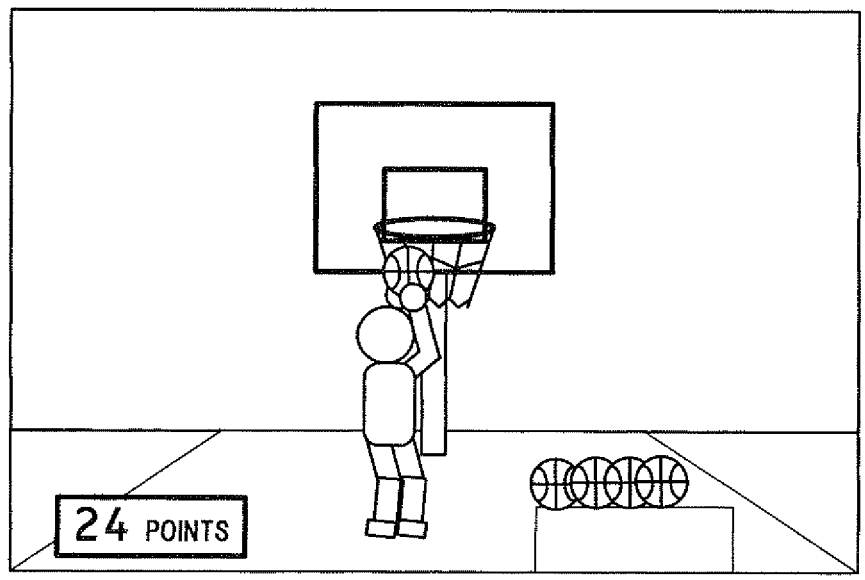
FIG. 11 is an exemplary game image displayed on the screen of the television 2.

Under a condition where the game image as shown in FIG. 9 is displayed on a television 2, when the player presses the B button 32*i* of the controller 5 while directing the input device 8 downward (that is, front edge of the controller 5 is situated lower than a rear edge of the controller 5), the player character grasps a ball, as shown in FIG. 10. When the player performs a jump operation (that is, swings the input device 8 up) thereafter, the player character is caused to jump vertically upward while holding the ball above his/her head as shown in FIG. 11.

Figure 8:
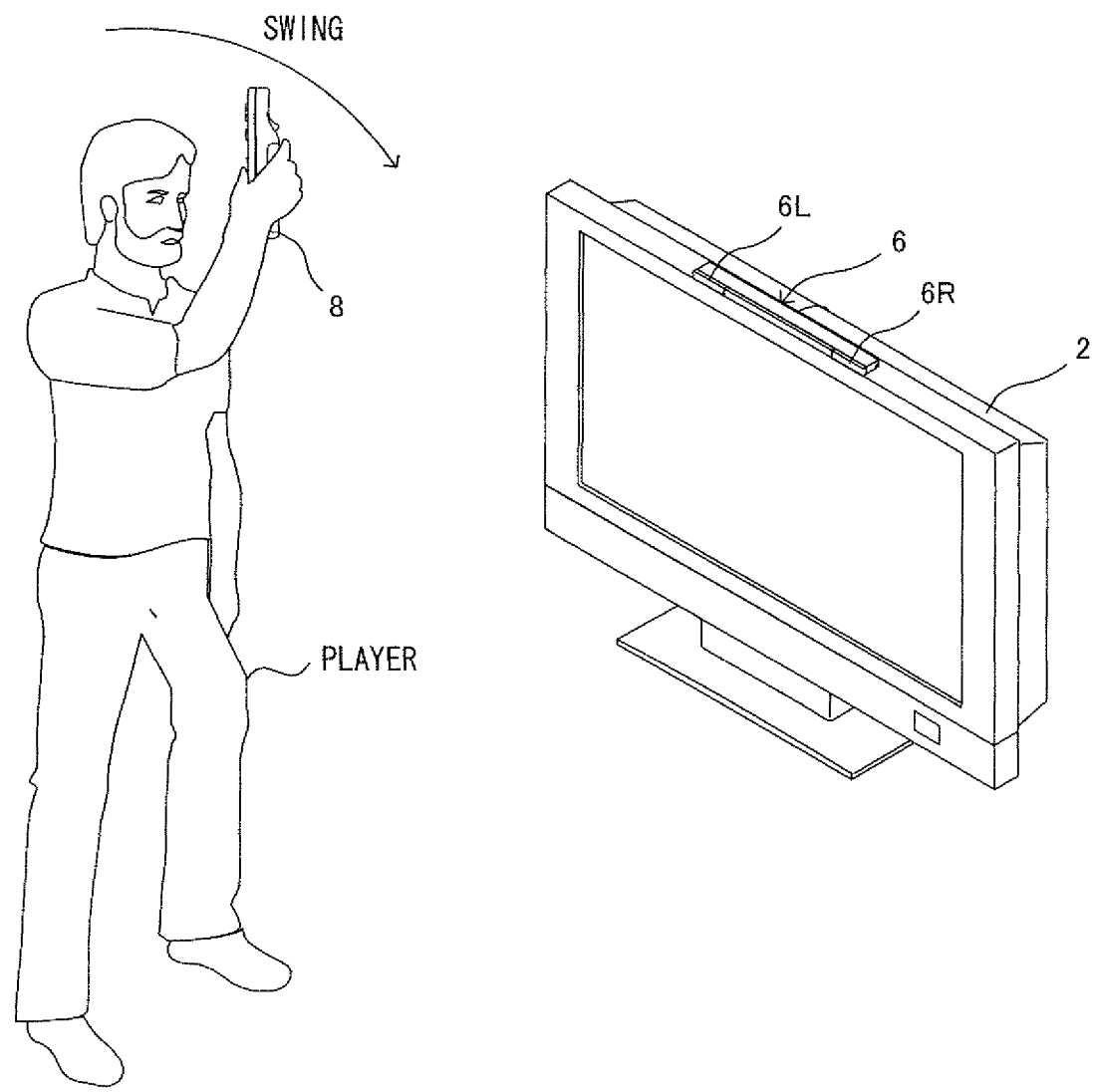
FIG. 8 is a diagram schematically illustrating a state where a game operation is performed with the use of the input device 8.
Figure 12:
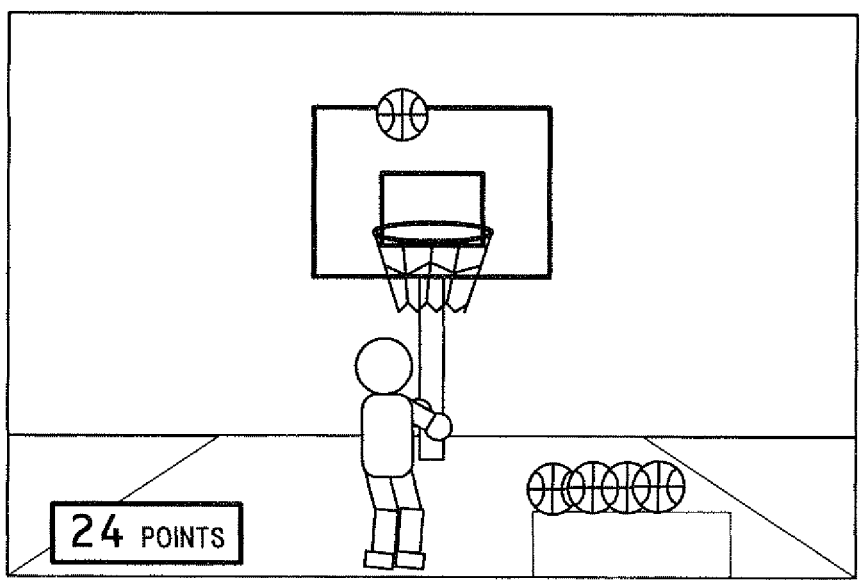
FIG. 12 is an exemplary game image displayed on the screen of the television 2.

When the player performs a shoot operation (that is, swings the input device 8 forward as shown in FIG. 8), after the player character has jumped, the player character is caused to throw the ball toward a basketball ring as shown in FIG. 12. The throwing direction and an initial velocity of the ball, in this case, vary depending on the manner that the player swings the input device 8 (that is, swing strength of the input device 8, swing timing of the input device 8, orientation of the input device 8 when the input device 8 has been swung, and a degree of twisting of the player's wrist when the input device 8 is swung). A moving direction, a moving speed, and a reached distance of a ball, which are obtained when a thrown ball passes through the center of the basketball ring, are a target moving direction, a target moving speed, and a target reached distance of the ball, respectively. When the input device 8 is swung in an ideal manner, or in a substantially ideal manner, shooting is performed successfully and scores are added. Otherwise, shooting results in failure, and the scores are not increased.

After shooting is performed, when the player presses again the B button 32*i* of the controller 5 while directing the front edge of the input device 8 downward, the player character grasps a new ball. In a similar manner to the previous case, in accordance with the operation of the player, the player character again performs shooting. In this manner, in accordance with the operation of the player, the player character performs shooting five times from a fixed position in a virtual game space. After the five shots are completed, the player character moves to another position and performs shooting another five times. In this manner, the player character performs a set of five shots, repetitively. That is, when completing each set, the player moves to a different position. When the player completes 5 sets (i.e., 25 shots), a result of the game (total scores obtained by the player) is displayed, and the game ends.

As described above, in the present embodiment, when the player performs the jump operation and the shoot operation, the player need not operate buttons provided on the controller 5. Instead, by swinging the player's arm holding the input device 8 as if the player performs shooting, the player character is caused to jump and perform shooting, and thus it is possible to provide a significantly intuitive game operation. Further, since the operation of the buttons on the controller 5 is not required at the time of the shoot operation, in particular, the player can swing the input device 8 while holding the same with his/her hand securely.

[Details of Game Process]

Figure 14:
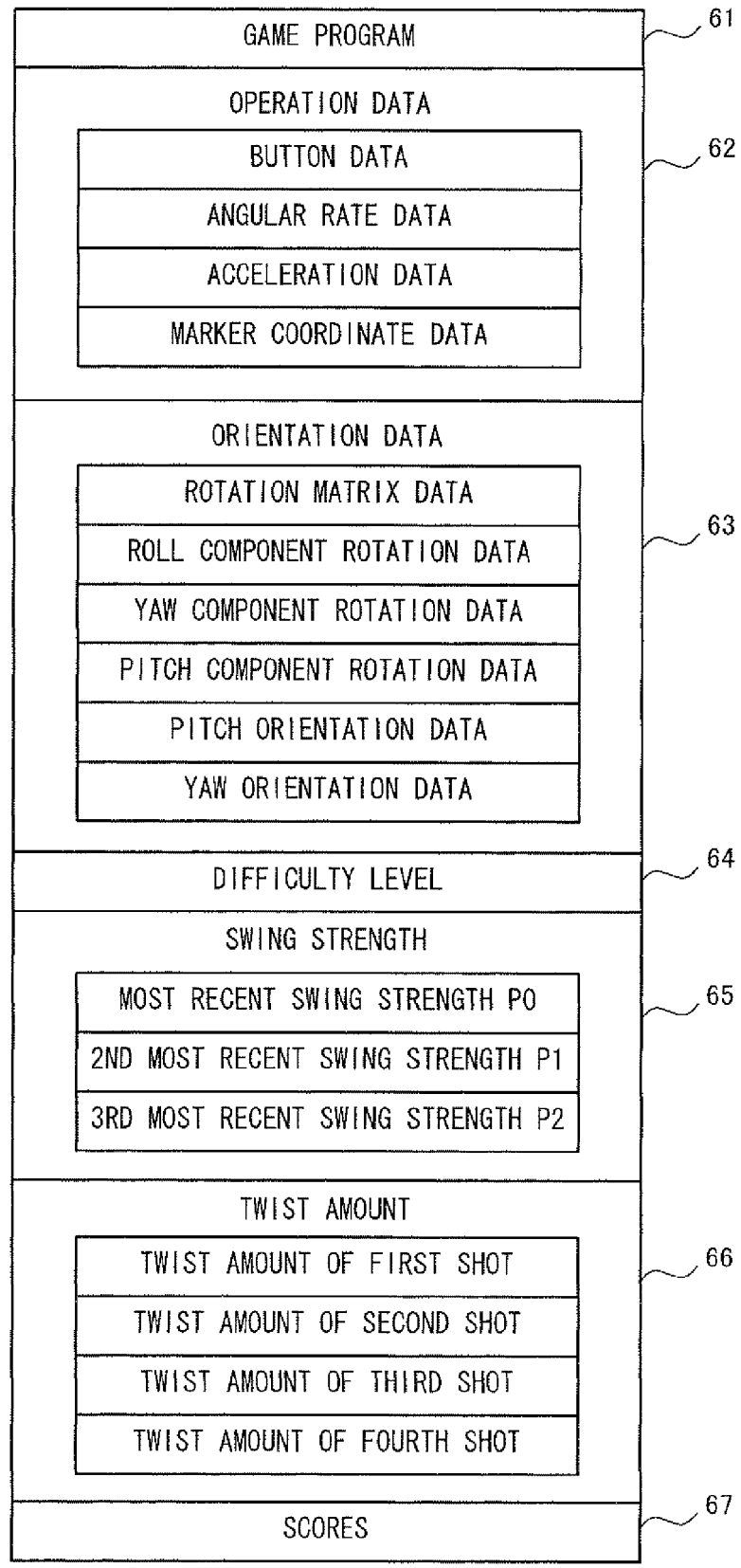
FIG. 14 is an exemplary memory map in an external main memory 12.

Next, the game process performed on the game apparatus 3 will be described in detail. First, with reference to FIG. 14, main data used in the game process performed on the game apparatus 3 will be described with reference to FIG. 14. FIG. 14 is a memory map in the external main memory 12 (which may be replaced with the internal main memory 11*e*) of the game apparatus 3. As shown in FIG. 14, the external main memory 12 is used as a game program storage area 61, an operation data storage area 62, an orientation data storage area 63, a difficulty level storage area 64, a swing strength storage area 65, a twist amount storage area 66, and a score storage area 67.

In the game program storage area 61, a game program to realize the above basketball game is stored. At an appropriate timing after the power is supplied to the game apparatus 3, the game program is partially or entirely loaded from the optical disc 4 and stored in the game program storage area 61 of the external main memory 12. In another embodiment, the game program may be supplied to the game apparatus 3 via an arbitrary computer-readable storage medium (e.g., a game cartridge, a magnetic disc, and the like) other than the optical disc, and be stored in the external main memory 12. Further, in still another embodiment, the game program may be loaded from a nonvolatile storage device (e.g., a flash memory) mounted in the game apparatus 3, and be stored in the external main memory 12. In still another embodiment, the game program may be supplied to the game apparatus 3 from another computer system (a game apparatus, or a game program distribution server apparatus) via wired or wireless communication line, and be stored in the external main memory 12.

In the operation data storage area 62, stored is operation data transmitted from the controller 5 to the game apparatus 3. As described above, the operation data is transmitted from the controller 5 to the game apparatus 3 at intervals of 1/200 seconds, and thus the operation data stored in the operation data storage area 62 is updated at intervals of 1/200 seconds. In the present embodiment, the operation data transmitted at intervals of 1/200 seconds is regarded as one sample, and in addition to the most recent operation data (having been obtained by the game apparatus 3 most recently), a predetermined number of samples of operation data obtained in the past is stored in the external main memory 12.

The operation data storage area 62 stores therein button data, angular velocity data, acceleration data, and marker coordinate data. The button data is data representing whether or not the respective buttons are pressed. The angular velocity data is a set of data representing angular velocities detected by the gyro-sensors 55 and 56 of the gyro-sensor unit 7. Namely, the angular velocity data represents the angular velocities around the respective axes in the XYZ-coordinate system shown in FIG. 3, and also represents a set of angular velocities around the respective axes detected currently and in the past. The acceleration data is a set of data representing acceleration (acceleration vector) detected by the acceleration sensor 37 currently and in the past. The marker coordinate data is data representing the above-described marker coordinate point, i.e., the coordinate point, calculated by the image processing circuit 41 of the imaging information calculation section 35. The marker coordinate point is based on a two-dimensional coordinate system for representing, on a plane, a position corresponding to a captured image.

The orientation data storage area 63 stores therein orientation data. The orientation data represents a set of data relating to the orientation of the input device 8 (controller 5), and includes rotation matrix data, roll component rotation data, pitch component rotation data, yaw component rotation data, pitch orientation data, and yaw orientation data.

The rotation matrix data is data representing rotation of the input device 8 (controller 5) from the reference orientation (the orientation in the case where the XYZ-axes coincide with the xyz-axes) to a current orientation, and the rotation is represented as a rotation matrix M. The rotation matrix M is represented by unit vectors of the input device 8, which indicate the X-axis, Y-axis, and Z-axis directions, and by expressing the unit vectors with the use of the coordinate system in the space defined by the xyz-axes. As with the operation data, the rotation matrix data is a set of data representing a predetermined number of samples of rotation matrices M, in addition to the most recent rotation matrix M. The rotation matrix M is represented by a 3×3 matrix, as indicated in formula (1) below.

$$M = \begin{bmatrix} Xx & Yx & Zx \\ Xy & Yy & Zy \\ Xz & Yz & Zz \end{bmatrix} \quad (1)$$

In addition, the roll component rotation data is data representing rotation of the input device 8 around the Z-axis, and is referred to as a roll component rotation matrix Mr. The pitch component rotation data is data representing rotation of the input device 8 around the X-axis, and is referred to as a pitch component rotation matrix Mp. Further, the yaw component rotation data is data representing rotation of the input device 8 around the Y-axis, and is referred to as a yaw component rotation matrix My. The roll component rotation matrix Mr, the pitch component rotation matrix Mp, and the yaw component rotation matrix My are each represented by a 3×3 matrix shown in the following formulas (2) to (4).

$$Mr = \begin{bmatrix} \cos\theta r & -\sin\theta r & 0 \\ \sin\theta r & \cos\theta r & 0 \\ 0 & 0 & 1 \end{bmatrix} \quad (2)$$

$$Mp = \begin{bmatrix} 1 & 0 & 0 \\ 0 & \cos\theta p & \sin\theta p \\ 0 & -\sin\theta p & \cos\theta p \end{bmatrix} \quad (3)$$

$$My = \begin{bmatrix} \cos\theta y & 0 & -\sin\theta y \\ 0 & 1 & 0 \\ \sin\theta y & 0 & \cos\theta y \end{bmatrix} \quad (4)$$

Here, rotation angles in the roll direction (around the Z-axis), the pitch direction (around the X-axis), and the yaw direction (around the Y-axis) are set as θr, θp, and θy, respectively. The angles θr, θp, and θy are obtained based on the angular velocity data. In other words, the angle θr is a rotation angle from the reference orientation around the Z-axis, and the rotation angle is obtained by integrating the angular velocity around the Z-axis. In a similar manner, the angles θp, and θy are also obtained by integrating the angular velocity around the X-axis, and the Y-axis, respectively. Generally, since an output from the gyro-sensors may include errors caused by drifts or the like, the orientation of the input device 8 may be corrected not only based on the integration of the angular velocity but also based on the acceleration data. Specifically, when the input device 8 is in a static state, or in a uniform motion, the acceleration indicated by the acceleration data corresponds to the gravity, and thus the orientation of the input device 8 is calculated based on the gravity direction, and the orientation calculated based on the angular velocity is corrected so as to be approximated to the orientation calculated based on the acceleration. In that case, if the degree of correction is set to be increased in the case where the magnitude of the acceleration is becoming closer to the magnitude of the gravity, it is possible to ignore the orientation of the input device in the case where the orientation cannot be calculated based on the acceleration, such as a case where the input device is moving. Further, it is possible to correct the orientation of the input device in accordance with the marker coordinate data. That is, based on a direction connecting the two marker coordinate points, it is possible to calculate the orientation of the input device in the roll direction, and also possible to correlate the marker coordinate points with the orientation in the yaw direction and/or the pitch direction. Accordingly, the orientation calculated based on the angular velocity and the orientation corrected based on the acceleration are approximated to the orientation calculated based on the marker coordinate points to a certain degree, whereby the orientation is corrected.

The above-described rotation matrix M is a result of the product of rotation matrices indicative of rotations in the roll direction, in the pitch direction, and in the yaw direction with respect to the Z-axis. That is, the rotation matrix M is the result of the product of the respective components in the rotation matrices expressed by the above formulas (2) to (4). In the present embodiment, the rotation matrix M (rotation matrix data) is calculated each time the angular velocity data is updated (at intervals of 1/200 seconds), and is stored in the external main memory 12.

The pitch orientation data is a set of data representing the orientation of the input device 8 in the pitch direction on the xyz-coordinate system, and the orientation in the pitch direction is obtained based on the above rotation matrix M. Here, the orientation in the pitch direction on the xyz-coordinate system is an orientation indicative of rotation around the x-axis, after the input device 8 is rotated based on the object coordinate system (XYZ-coordinate system), as viewed based on a space fixed coordinate system (xyz-coordinate system).

The yaw orientation data is a set of data representing the orientation of the input device 8 in the yaw direction in the xyz-coordinate system, and the orientation in the yaw direction is obtained based on the above rotation matrix M. Here, the orientation in the yaw direction in the xyz-coordinate system is an orientation representing rotation around the y-axis, after the input device 8 is rotated based on the object coordinate system (XYZ-coordinate system), as viewed based on the space fixed coordinate system (xyz-coordinate system).

The difficulty level storage area 64 stores therein a value indicative of a difficulty level of a game. In the present embodiment, the value of the difficulty level can be a real value ranges between 0 and 25.

The swing strength storage area 65 stores therein a most recent swing strength P0, a second most recent swing strength P1, a third most recent swing strength P2. The most recent swing strength P0 is a swing strength P calculated based on most recent angular velocity data. The second most recent swing strength P1 is a swing strength P calculated based on the angular velocity data one sample prior to the most recent swing strength (i.e., an angular velocity data sample obtained immediately prior to a most recent angular velocity data sample). In a similar manner, the second most recent swing strength P2 is a swing strength P calculated based on angular velocity data two samples prior to the most recent swing strength (i.e., an angular velocity data sample obtained two samples prior to the most recent angular velocity data sample). A method for calculating the swing strength P will be described later.

The twist amount storage area 66 stores therein a twist amount R1 of a first shot, a twist amount R2 of a second shot, a twist amount R3 of a third shot, and a twist amount R4 of a fourth shot. The twist amount R1 of the first shot is a twist amount R calculated based on angular velocity data of the first shot, among a total of 25 shots performed by the player character in the basketball game. The twist amount R2 of the second shot is a twist amount R calculated based on angular velocity data of the second shot, among the total of 25 shots performed by the player character in the basketball game. In a similar manner, the twist amount R3 of the third shot is a twist amount R calculated based on angular velocity data of the third shot, and the twist amount R4 of the fourth shot is a twist amount R calculated based on the angular velocity data of the fourth shot. A method for calculating the twist amount R will be described later.

In the score storage area 67, a value indicative of scores achieved by the player is stored.

Note that the external main memory 12 stores therein data necessary for a game process such as image data of various objects (a player character, a ball, and the like) appearing on a game, data indicative of various parameters of the objects, and the like, as well as the above-described game program and various data.

The above-described game program and various data may be stored in the internal main memory 11e, instead of the external main memory 12.

In addition, all the above-described various data need not be stored in the external main memory 12, provided that at least such data that is required for a game process is stored in the external main memory 12. For example, in the case where the yaw orientation data is not used in a game process, the yaw orientation data need not be stored in the external main memory 12.

Figure 15:
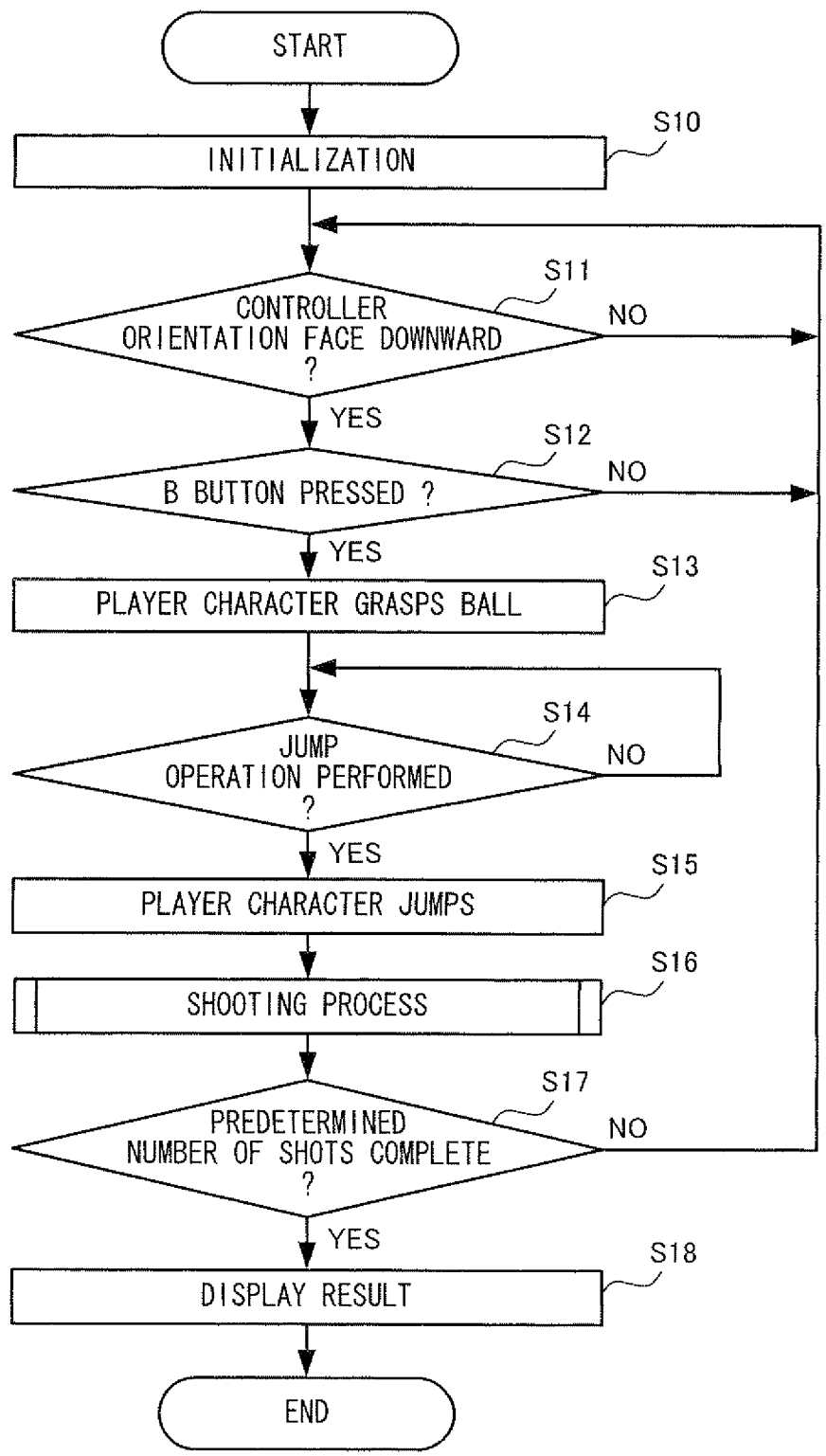
FIG. 15 is a main flowchart showing a flow of a game process executed on the game apparatus 3.
Figure 16:
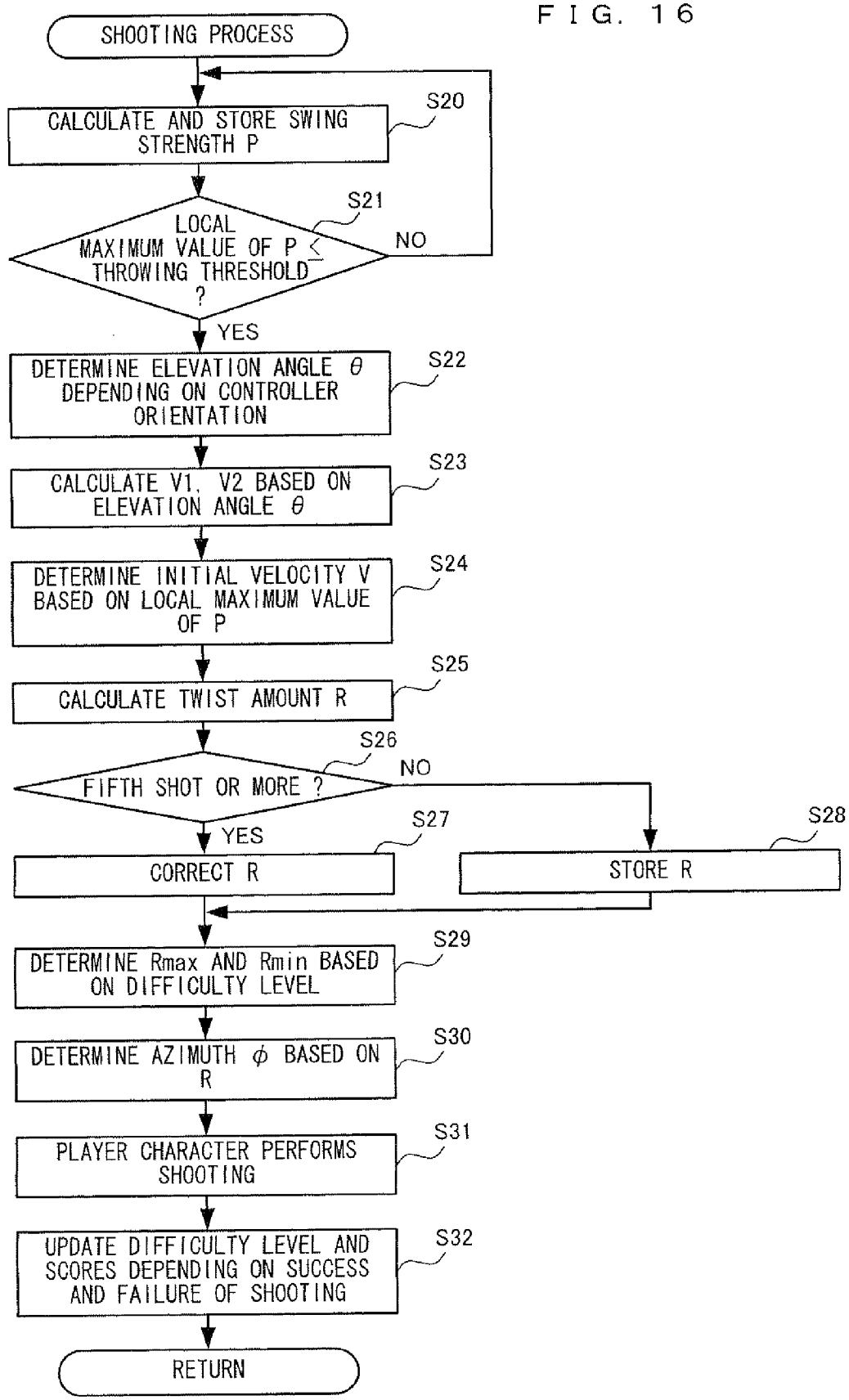
FIG. 16 is a flowchart showing, in detail, a shooting process (step S16) shown in FIG. 15.

Next, with reference to flowcharts shown in FIGS. 15 and 16, a flow of a game process executed by the CPU10 in the game apparatus 3 in accordance with the game program will be described.

When the game apparatus 3 is powered on, the CPU10 in the game apparatus 3 executes a boot program stored in a boot ROM (not shown), so as to initialize the respective units such as the external main memory 12. The game program stored in the optical disc 4 is loaded to the external main memory 12, and the CPU10 starts executing the game program 61. The flowchart shown in FIG. 15 is a flowchart showing process to be performed after the above-described processes are completed. In the flowchart shown in each of FIGS. 15 and 16, for the sake of simple explanation, omitted are processes such as a process of obtaining operation data from the controller 5 and of storing the same in the external main memory 12 periodically, and a process of calculating and then storing a rotation matrix and the like in the external main memory 12 in accordance with the obtained operation data, the rotation matrix being indicative of the orientation of the input device 8. In the flowchart shown in each of FIGS. 15 and 16, a process of controlling a motion of a player character, and a game image generation process, which are well-known technique for those skilled in the art, are also omitted.

In step S10, the CPU10 performs an initialization process. In the initialization process includes, for example, a process of setting various pieces of data stored in the external main memory 12 to their initial values. For example, the difficulty level is set to "1" as the initial value, and the score is set to "0" as the initial value.

In step S11, the CPU10 determines whether or not the orientation of the controller 5 is in the downward direction (i.e., a situation where the front edge of the controller 5 is situated lower than the rear edge of the controller 5). When the Zy component of the rotation matrix M is negative, the Z-axis of the controller 5 faces the downward direction in the xyz space, and thus it is possible to determine that the orientation of the controller 5 is in the downward direction. Further, the determination can be made based on the pitch orientation data stored in the external main memory 12. In step S11, when it is determined that the orientation of the controller 5 is in the downward direction, the process proceeds to step S12. Otherwise, step S11 is repeated until it is determined that the orientation of the controller 5 is in the downward direction.

In step S12, the CPU10 determines whether or not the B button 32i of the controller 5 has been pressed by the player, based on the button data in the operation data storage area 62. When it is determined that the B button 32i has been pressed, the process proceeds to step S13. Otherwise, the process proceeds to step S11.

In step S13, the CPU10 controls the motion of a player character such that the player character grasps a ball in the virtual game space.

In step S14, the CPU10 determines whether or not the jump operation is performed by the player. In the present embodiment, whether or not the player swings the input device 8 up is determined in consideration of all the factors of current acceleration in the Z-axis direction, a current angular velocity around the X-axis, a current angular velocity around the Y-axis, and a current orientation of the input device 8 in the pitch direction in the xyz-coordinate system. When it is determined that the player swings the input device 8 up above his/her head, it is determined that the jump operation has been performed. When it is determined that the jump operation has been performed, the process proceeds to step S15. Otherwise, step S14 is repeated until it is determined that a jump start condition is satisfied.

In step S15, the CPU10 controls the motion of the player character such that the player character starts jumping in the virtual game space.

In step S16, the CPU10 performs a shooting process. The shooting process is a process to cause the player character to perform shooting of a basketball. The shooting process will be described later in detail with reference to the flowchart shown in FIG. 16. When the shooting process in step S16 ends, the process proceeds to step S17.

In step S17, the CPU10 determines whether or not a predetermined number of shots (25 shots in the present embodiment) are completed. When the predetermined number of shots has been completed, the process proceeds to step S18. Otherwise, the process returns to step S11.

In step S18, the CPU10 generates and then displays on the television 2 a result image indicative of, for example, scores achieved by the player, and terminates the game process.

Next, with reference to the flowchart shown in FIG. 16, the shooting process in step S16 shown in FIG. 15 will be described in detail.

When the shooting process is started, in step S20, the CPU10 calculates the swing strength P based on the most recent angular velocity data, and stores the calculated value in the external main memory 12 as the "most recent swing strength P0". At that time, a value, which has been stored as the most recent swing strength P0 in the external main memory 12 before the process proceeds to step S20, is then stored as the "second most recent swing strength P1" in the external main memory 12. In a similar manner, a value which has been stored as the second most recent swing strength P1 in the external main memory 12 before the process proceeds to step S20, is then stored as the "third most recent swing strength P2" in the external main memory 12.

Figure 17:
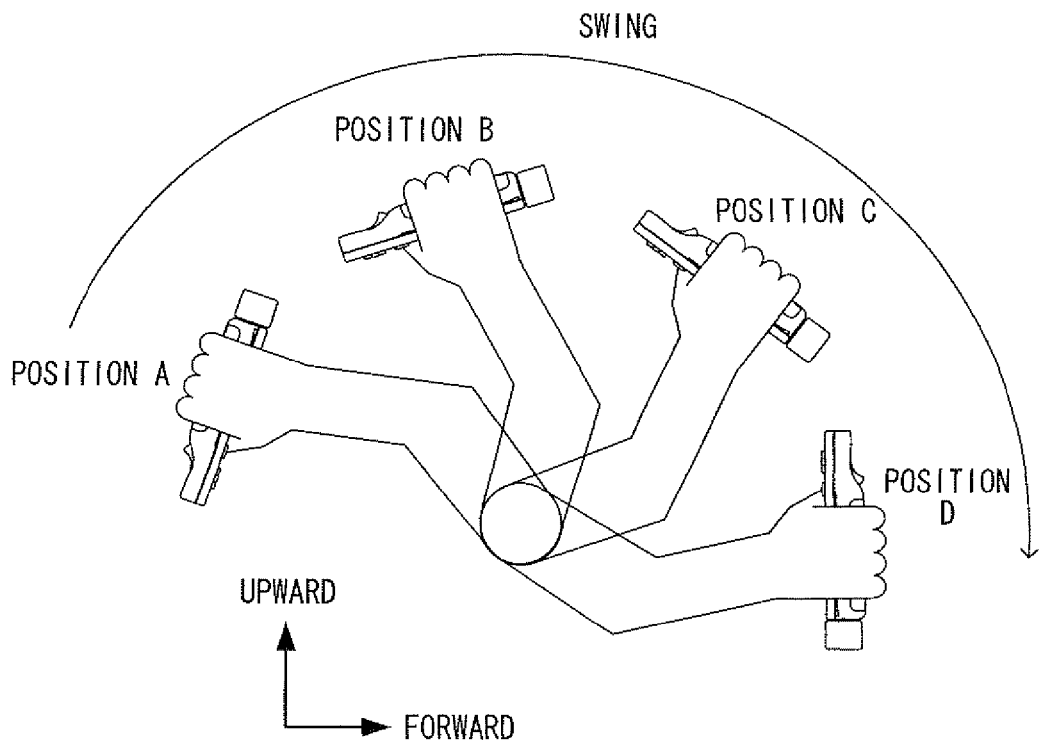
FIG. 17 is a diagram showing a motion of a player's arm at the time of a shoot operation.
Figure 18:
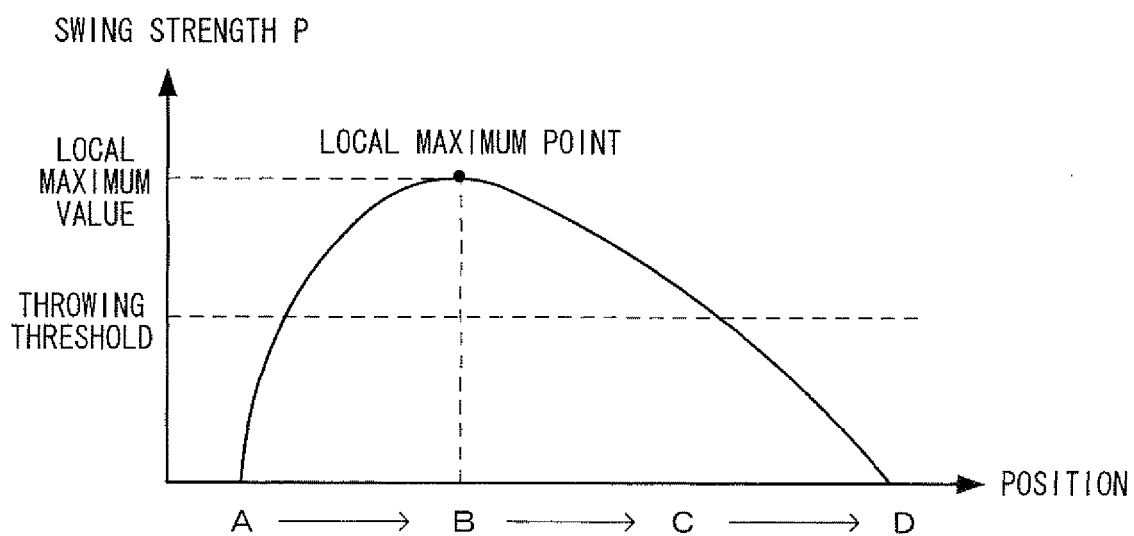
FIG. 18 is a diagram illustrating a change in swing strength P at the time of the shoot operation.

The swing strength P is an index indicative of the strength of swinging the input device 8 performed by the player, and is calculated, in the present embodiment, based on the angular velocity around the X-axis and the angular velocity around the Y-axis, as an example. Specifically, when the angular velocity around the X-axis is Rx, and the angular velocity around the Y-axis is Ry, then the swing strength P is calculated from $\sqrt{(Rx^2+Ry^2)}$. Such calculated swing strength P represents the magnitude of the angular velocity around the X-axis and/or the Y-axis when the input device 8 is rotated. When the player swings his/her arm holding the input device 8 from a position A to a position D through a position B and position C as shown in FIG. 17 in a manner as if a shooting motion in the basketball is performed, the value of the swing strength P varies during the process of swinging as indicated with a curve shown in FIG. 18. In an example shown in FIG. 18, the swing strength P reaches its local maximum when the player's arm is situated at the position B, however, a local maximum point of the swing strength P varies depending on the manner that the player swings the input device 8. In FIG. 17, the player holds the input device 8 in such a manner that the input device 8 rotates around the X-axis when the player swings the input device 8. However, in the present embodiment, since the swing strength P is calculated based on both of the angular velocity around the X-axis and the angular velocity around the Y-axis, it is possible to appropriately detect the strength of the player's swinging of the input device 8 as the swing strength P regardless of the manner that player holds the input device 8.

Figure 19:
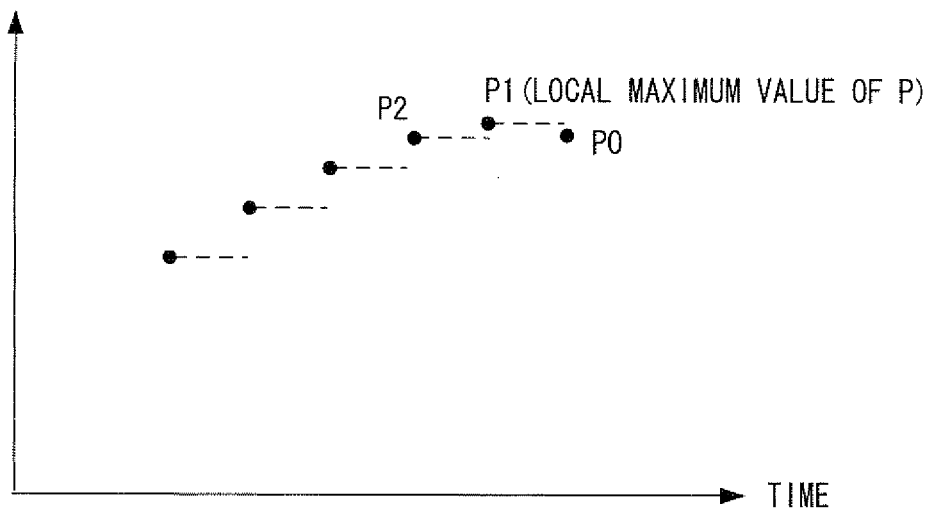
FIG. 19 is a diagram illustrating a method for detecting a local maximum value of the swing strength P and a method for determining a shoot timing.

In step S21, the CPU10 determines whether or not a local maximum value of the swing strength P is equal to or greater than a throwing threshold. In the present embodiment, whether or not the swing strength P reaches its local maximum point is determined based on the "most recent swing strength P0", the "second most recent swing strength P1", and the "third most recent swing strength P2" which are stored in the external main memory 12. Specifically, when the value of the "second most recent swing strength P1" is greater than the value of the "third most recent swing strength P2", and when the value of the "most recent swing strength P" is equal to or lower than the "second most recent swing strength P1", it is determined that the swing strength P has reached its local maximum point, and the value of the "second most recent swing strength P1" is obtained as the local maximum value (note that in the case where the local maximum value is no need to be precise, the value of the "most recent swing strength P0" may be regarded as the local maximum value). For example, when the swing strength P changes as shown in FIG. 19, the magnitude of a point P1 shown in FIG. 19 is obtained as the local maximum value of the swing strength P. It is impossible to determine whether or not the player performs the shoot operation precisely only by checking whether or not the swing strength P reaches the local maximum point. This is because even when the player does not swing the input device 8, the value of the swing strength P always changes slightly, and even in such a case, the local maximum point can be obtained from low values. Thus, in the present embodiment, when the local maximum value of the swing strength P is equal to or greater than the predetermined throwing threshold (see FIG. 18), it is determined that the shoot operation by the player has been performed. Substantially, a similar determination can be made even if it is determined that the shoot operation has been performed by the player when the local maximum value of the swing strength P is "greater than" the predetermined throwing threshold. In step S21, when the local maximum value of the swing strength P is equal to or greater than the throwing threshold, the process proceeds to step S22. Otherwise, the process returns to step S20. In the following description, a point of time (the "point of time" does not strictly indicate an "instant" at which the swing strength P reaches it local maximum), at which the swing strength P is equal to or greater than the throwing threshold, and reaches its local maximum, may be simply referred to as the "time of throwing".

Figure 20:
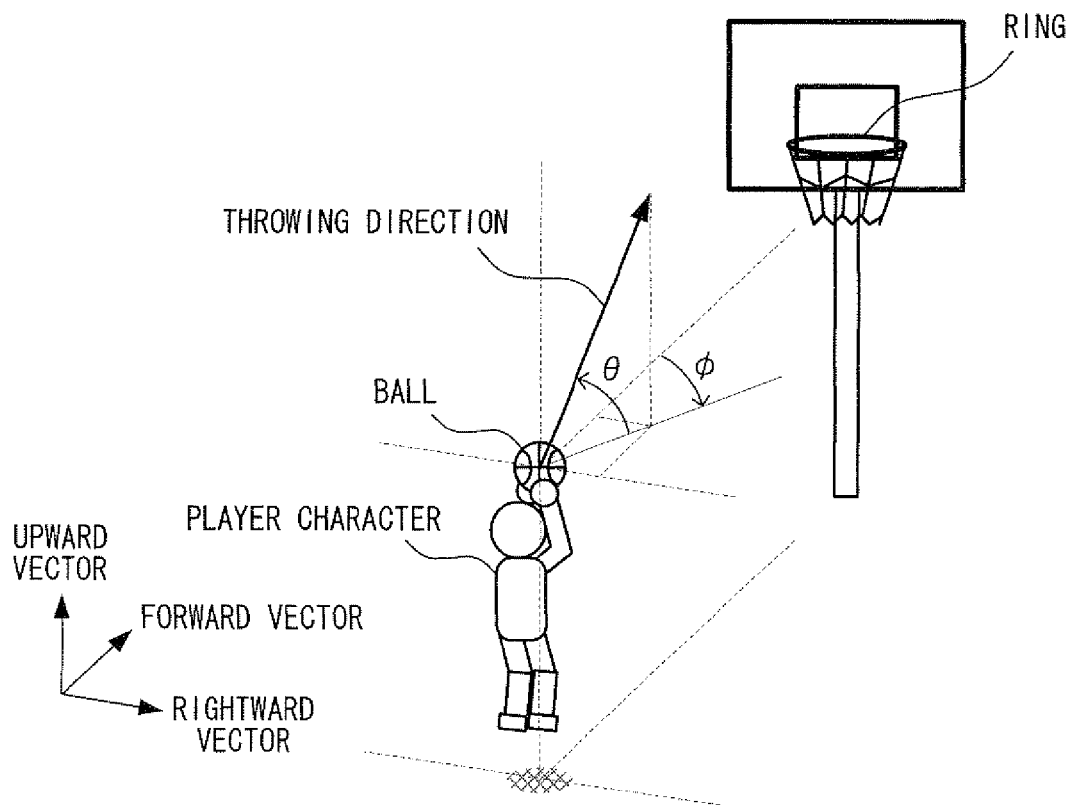
FIG. 20 is a diagram showing a throwing direction in a virtual three-dimensional game space.

In step S22, the CPU10 determines an elevation angle θ in a throwing direction of a ball in the virtual game space, based on the orientation of the controller 5 at the time of throwing. The throwing direction of the ball in the virtual game space indicates a direction in which a ball is released when the player character performs shooting of a basketball, as shown in FIG. 20. The elevation angle θ in the throwing direction represents an angle between the throwing direction and the horizontal plane in the virtual game space.

Figure 21:
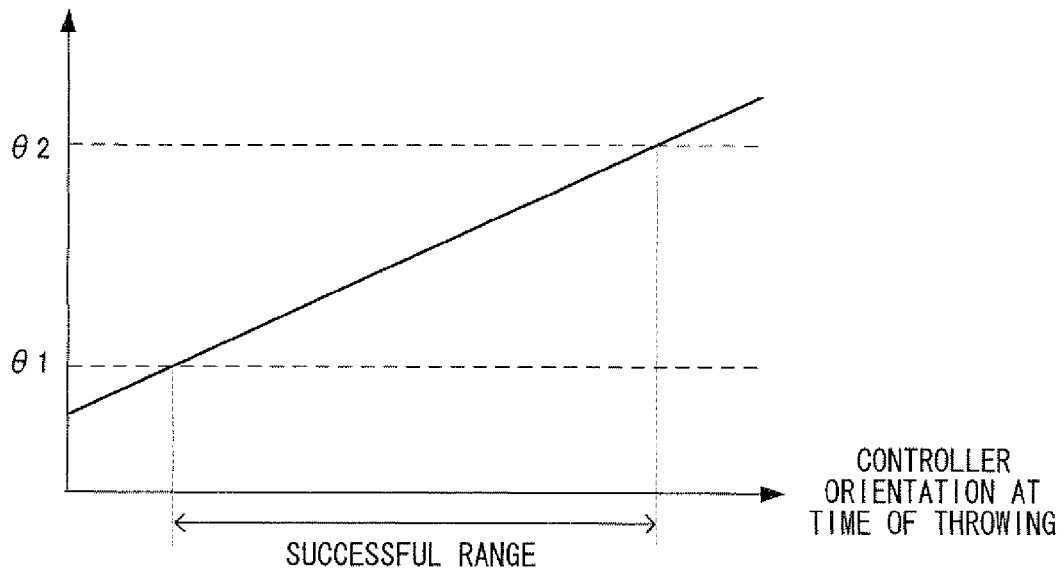
FIG. 21 is a diagram illustrating a method for determining an elevation angle $\theta$ in a throwing direction.

In the present embodiment, the elevation angle θ in the throwing direction is determined based on the orientation in the pitch direction of the controller 5 at the time of throwing. The orientation in the pitch direction of the controller 5 is represented by the pitch orientation data stored in the external main memory 12. For example, as shown in FIG. 21, the CPU10 determines the elevation angle θ with the use of a function or a table that defines correlation between the orientation in the pitch direction of the controller 5 and the elevation angle θ in the throwing direction. In an example shown in FIG. 21, the correlation between the orientation in the pitch direction of the controller 5 and the elevation angle θ is indicated linearly (i.e. as a linear function), and may be indicated with an arbitrary curve, alternatively. This may be applied to other drawings (FIGS. 22 to 26, and 30) to be described later. In the present embodiment, under a condition where the player swings his/her arm as shown in FIG. 17, when the swing strength P reaches its local maximum point at an earlier timing, the elevation angle θ becomes large, whereas when the swing strength P reaches its local maximum point at a later timing, the elevation angle θ becomes smaller. When the elevation angle θ is too large or too small, the ball does not reach the basketball ring in the virtual game space. Specifically, when the elevation angle θ is smaller than a minimum successful elevation angle θ1, or is larger than the maximum successful elevation angle θ2, the ball cannot reach the basketball ring. Therefore, to make a successful shot, the orientation in the pitch direction of the controller 5 at the time of throwing needs to stay in a successful range shown in FIG. 21. That is, to make a successful shot, the player needs to cause the swing strength P to reach the local maximum point while the orientation in the pitch direction of the controller 5 is staying within the successful range.

In step S23, the CPU10 calculates a minimum successful initial velocity V1 and a maximum successful initial velocity V2, based on the elevation angle θ determined in step S22. The minimum successful initial velocity V1 is a minimum value of an initial velocity V of a ball for a successful shot when it is assumed that the player character has thrown the ball toward the direction of the elevation angle θ, which is determined in step S22, aiming at a basketball ring (regarding the left/right direction, the ball is assumed to be thrown straight toward the basketball ring). In other words, when the initial velocity V of the ball is lower than the minimum successful initial velocity V1, the ball does not reach the basketball ring, resulting in shot failure. Further, the maximum successful initial velocity V2 is a maximum value of the initial velocity V of a ball for a successful shot when it is assumed that the player character has thrown the ball toward the direction of the elevation angle θ, which is determined in step 22, aiming at the basketball ring. In other words, when the initial velocity V of the ball is greater than the maximum successful initial velocity V2, the ball flies over the basketball ring, resulting in shot failure.

Figure 22:
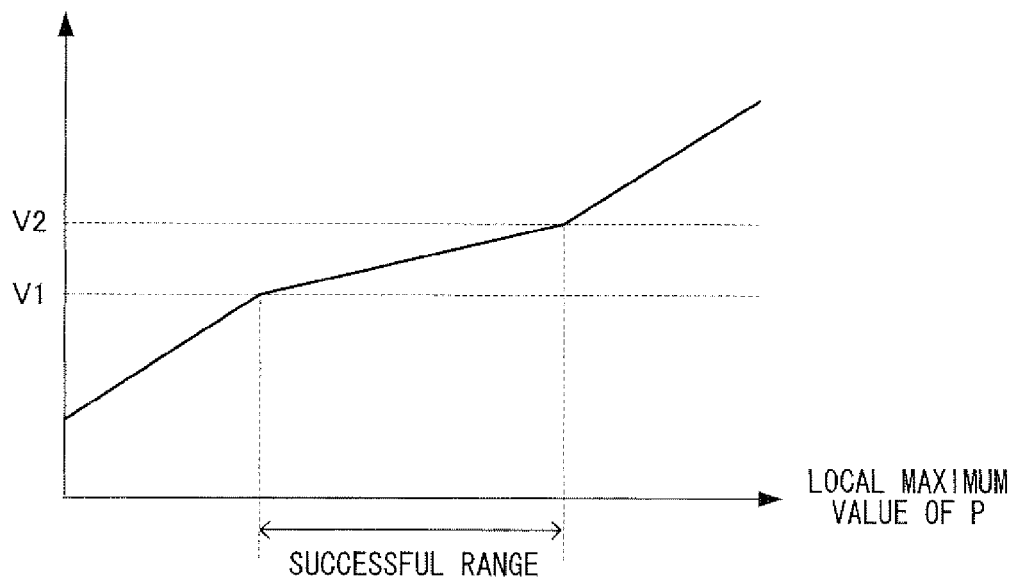
FIG. 22 is a diagram illustrating a method for determining an initial velocity of a ball.
Figure 23:
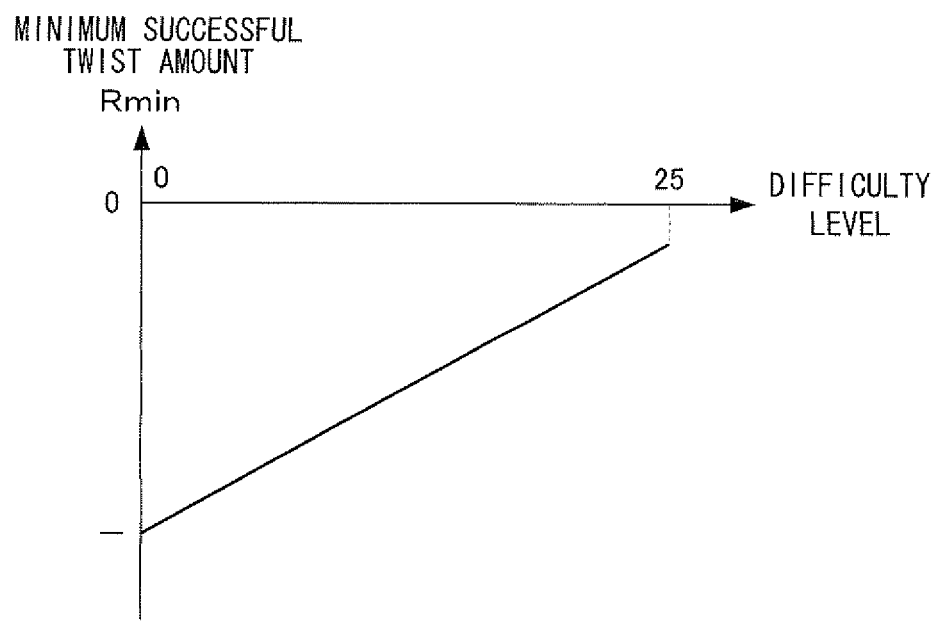
FIG. 23 is a diagram illustrating a method for determining a minimum successful twist amount Rmin corresponding to a difficulty level.
Figure 24:
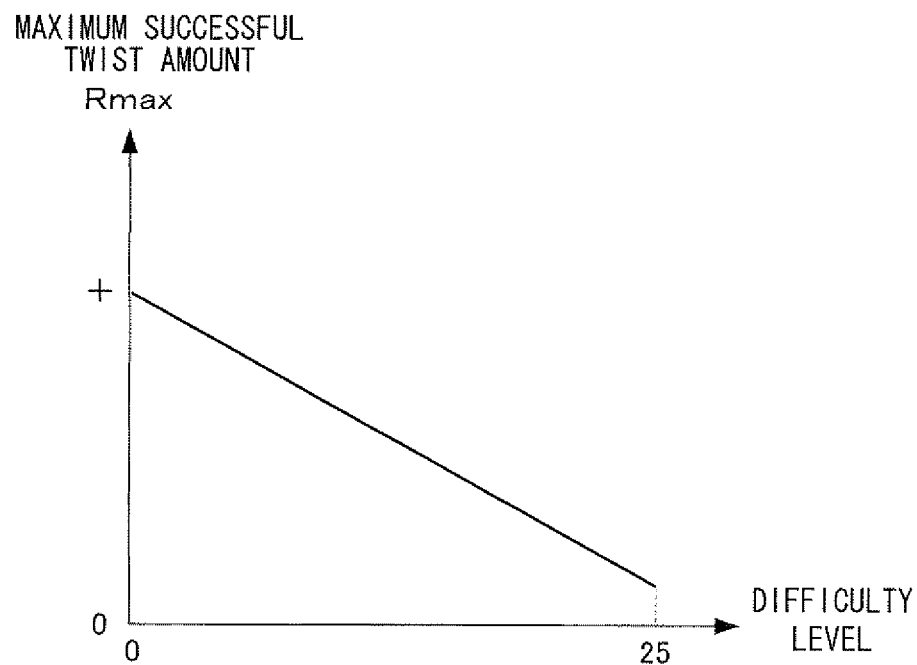
FIG. 24 is a diagram illustrating a method for determining a maximum successful twist amount Rmax corresponding to the difficulty level.

In step S24, the CPU10 determines the initial velocity V of the ball in accordance with the local maximum value of the swing strength P (i.e., the swing strength P at the time of throwing). The CPU10 determines, as shown in FIG. 22, for example, the initial velocity V with the use of a function or a table defining correlation between the local maximum value of the swing strength P and the initial velocity V of the ball. In the present embodiment, as shown in FIG. 22, the local maximum value of the swing strength P has a fixed successful range, and when the local maximum value of the swing strength P coincides with a lower limit of the successful range (minimum successful local maximum value), the initial velocity V of the ball is the same as the minimum successful initial velocity V1, whereas when the local maximum value of the swing strength P coincides with an upper limit of the successful range (maximum successful local maximum value), the initial velocity V of the ball is the same as the maximum successful initial velocity V2. When the local maximum value of the swing strength P is lower than the minimum successful local maximum value, the initial velocity V of the ball is lower than the minimum successful initial velocity V1, and the ball does not reach the basketball ring, resulting in shot failure. In a similar manner, when the local maximum value of the swing strength P is greater than the upper limit of the successful range, the initial velocity V of the ball is greater than the maximum successful initial velocity V2, and the ball flies over the basketball ring, resulting in shot failure. Further, when the local maximum value of the swing strength P stays within a predetermined successful range, the initial velocity V of the ball is determined as a value in a range between the minimum successful initial velocity V1 and the maximum successful initial velocity V2.

In step S25, the CPU10 calculates the twist amount R, based on the angular velocity around the Z-axis at the time of throwing. In the present embodiment, the CPU10 calculates, as the twist amount R, an average value of angular velocities around the Z-axis of recent several samples obtained from the angular velocity data stored in the external main memory 12. In another embodiment, an angular velocity around the Z-axis of a most recent sample may be used as the twist amount R.

In step S26, the CPU10 determines whether or not a current shot is a fifth shot or more from the start of the basketball game. When the current shot is the fifth shot or more, the process proceeds to step S27. Otherwise (that is, the current shot is one of the first to fourth shots), the process proceeds to step S28.

In step S27, the CPU10 corrects a current twist amount R (i.e., the twist amount R calculated in immediately preceding step S25), based on the twist amount R1 of the first shot to the twist amount R4 of the fourth shot which are stored in the external main memory 12. A method for correcting the twist amount R in step S27 will be described later.

In step S28, the CPU10 stores, in the external main memory 12, the value of the current twist amount R (i.e., the twist amount R calculated in immediately preceding step S25) as any one of the "twist amount R1 of the first shot" to the "twist amount R4 of the fourth shot". For example, when the current shot is the first shot, the twist amount R1 of the first shot is stored as the current twist amount R. In a similar manner, when the current shot is the second shot, the twist amount R2 of the second shot is stored as the current twist amount R.

In step S29, the CPU10 determines a minimum successful twist amount Rmin, and a maximum successful twist amount Rmax, based on the value of the "difficulty level" stored in the external main memory 12. The minimum successful twist amount Rmin and the maximum successful twist amount Rmax are variables indicative of the lower limit and the upper limit of the successful range of the twist amount R for achieving a successful shot, respectively, and the values may vary depending on the difficulty level. In the present embodiment, the minimum successful twist amount Rmin is a negative value, and the maximum successful twist amount Rmax is a positive value. The CPU 10 determines the minimum successful twist amount Rmin with the use of a function or a table defining correlation between the difficulty level and the minimum successful twist amount Rmin. In addition, the CPU 10 determines the maximum successful twist amount Rmax with the use of a function or a table defining correlation between the difficulty level and the maximum successful twist amount Rmax. As a result, in the present embodiment, the higher the difficulty level is, the narrower the successful range of the twist amount R becomes.

In step S30, the CPU 10 determines an azimuth $\phi$ in the throwing direction of the ball in the virtual game space, based on the twist amount R corrected in step S27 (or, based on twist amount R calculated in step S25 when the current shot is any one of the first to fourth shots). As shown in FIG. 20, the azimuth $\phi$ in the throwing direction represents an angle between a front vector and the horizontal plane, when a horizontal vector representing a direction extending from the player character to the basketball ring in the virtual game space is regarded as the front vector.

Figure 25:
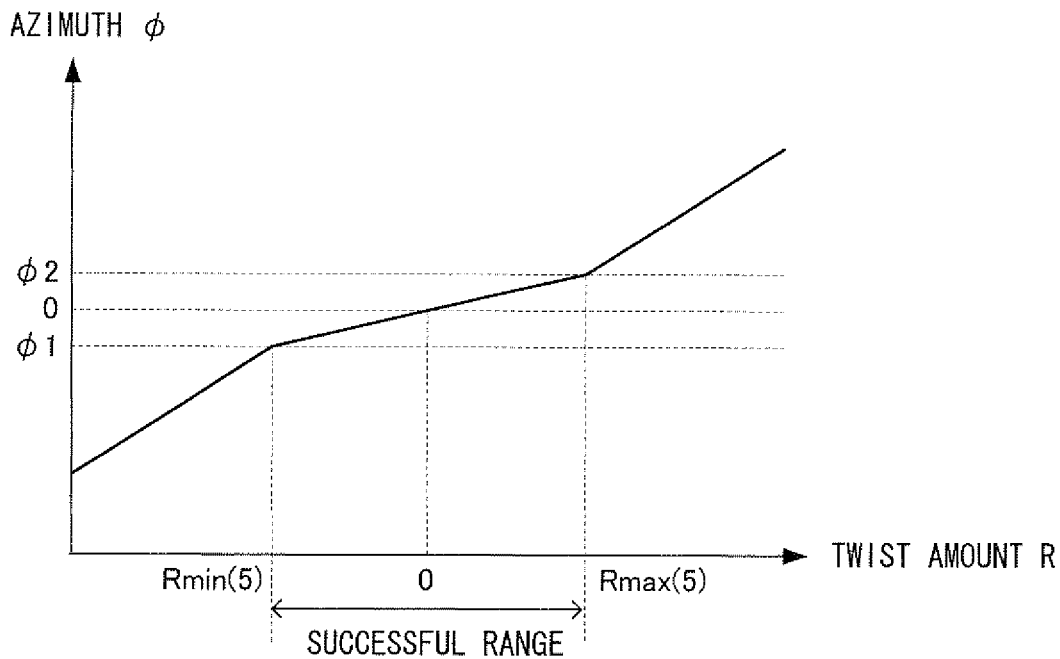
FIG. 25 is a diagram illustrating a method for determining an azimuth $\phi$ in the throwing direction in the case where the difficulty level is 5.
Figure 26:
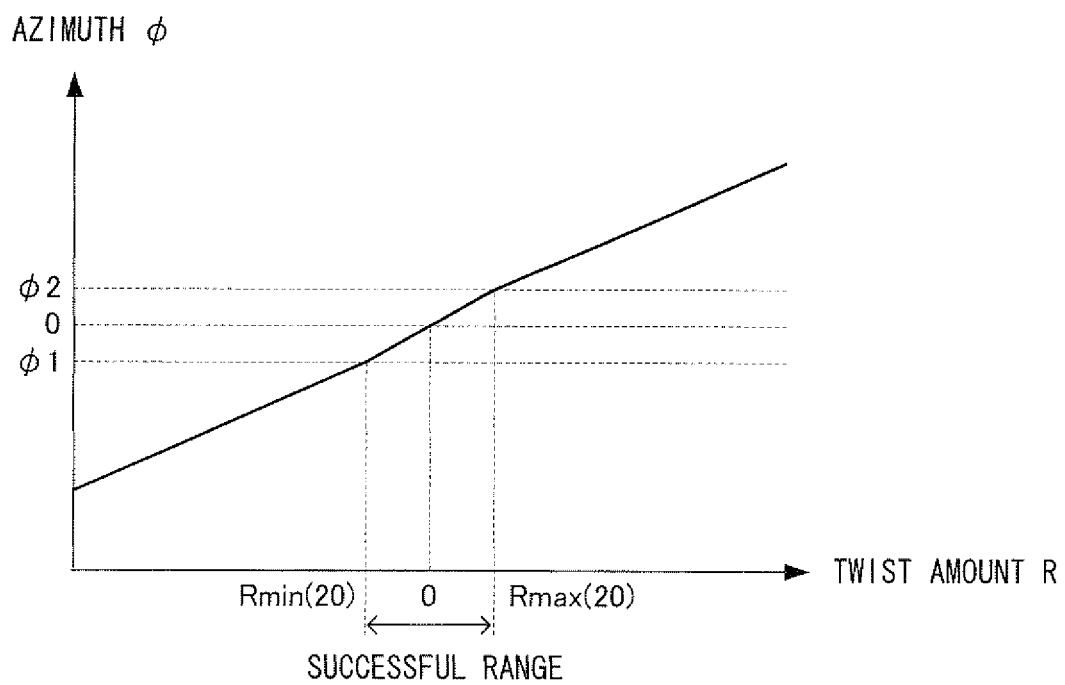
FIG. 26 is a diagram illustrating a method for determining the azimuth $\phi$ in the throwing direction in the case where the difficulty level is 15.

The CPU 10 determines the azimuth $\phi$ with the use of a function or a table defining correlation between the twist amount R and the azimuth $\phi$ in the throwing direction, as shown in FIG. 25, for example. In the present embodiment, the target value of the twist amount R is "0", and when the twist amount R is "0", the azimuth $\phi$ is "0". That is, when the controller 5 is not rotating around the Z-axis at all at the time of throwing, the ball will not deviate from the center of the basketball ring to the left or right, but be released straight toward the center of the basketball ring. On the other hand, when the controller 5 is rotating around the Z-axis at the time of throwing, an absolute value of the azimuth $\phi$ increases in accordance with the angular velocity, and consequently, the ball is released toward a direction deviating from the center of the basketball ring to the left or right. When the azimuth $\phi$ is too large or to small, the path of the ball in the virtual game space deviates from the basketball ring. Specifically, when the azimuth $\phi$ is smaller than the minimum successful azimuth $\phi 1$ shown in FIG. 25, the path of the ball deviates from the basketball ring to the left, whereas when the azimuth $\phi$ is greater than the maximum successful azimuth $\phi 2$ shown in FIG. 25, the path of the ball deviates from the basketball ring to the right. Therefore, to make a successful shot, the twist amount R needs to stay in the successful range (i.e., the target range) shown in FIG. 25.

The lower limit (i.e., the minimum successful twist amount Rmin) and the upper limit (i.e., the maximum successful twist amount Rmax) of the successful range of the twist amount R are determined, in step S29, based on the difficulty level. Therefore, in accordance with a current difficulty level, the successful range of the twist amount R varies. FIG. 25 shows a relation between the twist amount R and the azimuth $\phi$ when the difficulty level is "5", and FIG. 25 shows a relation between the twist amount R and the azimuth $\phi$ when the difficulty level is "20". As is clear from FIGS. 25 and 26, the higher the difficulty level is, the narrower the successful range of the twist amount R becomes. That is, the higher the difficulty level is, the more accurately the player needs to perform the shoot operation in order to make a successful shot. On the other hand, the lower the difficulty level is, the wider the successful range of the twist amount R becomes. Accordingly, supposing that shoot operations are performed in a fixed form, when the difficulty level is lower, the azimuth $\phi$ in the throwing direction is corrected such that the path of the ball passes closer to the center of the basketball ring.

In step S31, the CPU 10 controls a motion of the player character such that the player character performs shooting in the virtual game space. The CPU 10 then controls the movement of the ball, based on the elevation angle $\theta$ in the throwing direction determined in step S22, the initial velocity V determined in step S24, and the azimuth $\phi$ in the throwing direction determined in step S30.

In step S32, the CPU 10 updates the difficulty level and scores, which are stored in the external main memory 12, depending on the success or failure of a shot. Specifically, when the orientation in the pitch direction of the controller 5 at the time of throwing stays in the successful range shown in FIG. 21, and the local maximum value of the swing strength P stays in the successful range shown in FIG. 22, and the twist amount R at the time of throwing stays in the successful range (in this case, the ball released by the player character eventually passes through the basketball ring), then the CPU 10 determines that the shot has been made successfully. Otherwise, the CPU 10 determines that the shot has failed.

In step S32, basically, the difficulty level increases when a shot has been made successfully, and decreases when a shot has failed. As a method for updating the difficulty level, various methods may be considered. Hereinafter, variations in the method for updating the difficulty level in step S32 will be described.

Figure 27:
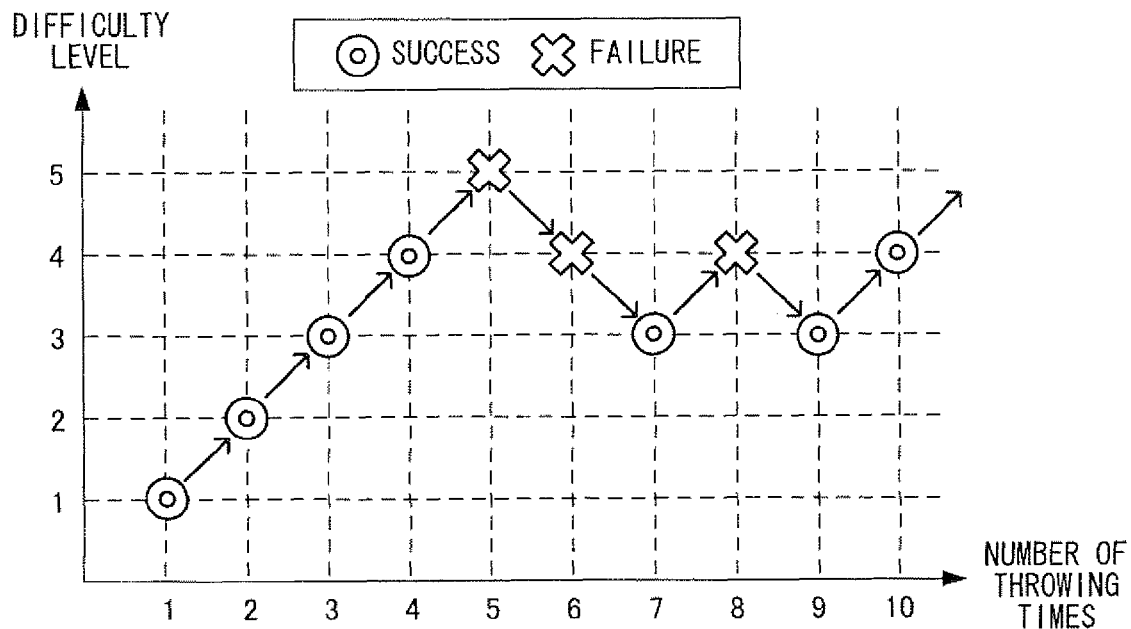
FIG. 27 is a first exemplary method for updating the difficulty level in accordance with success or failure in shooting.

FIG. 27 shows an exemplary case where a predetermined value ("1" in the example of FIG. 27) is added to the current difficulty level when a shot has been made successfully, whereas a predetermined value ("1" in the example of FIG. 27) is subtracted from the current difficulty level when the shot has failed. In this manner, the difficulty level is set adaptively in accordance with the skill of the player, and thus it is possible to prevent the player from feeling the game to easy or too difficult.

Figure 28:
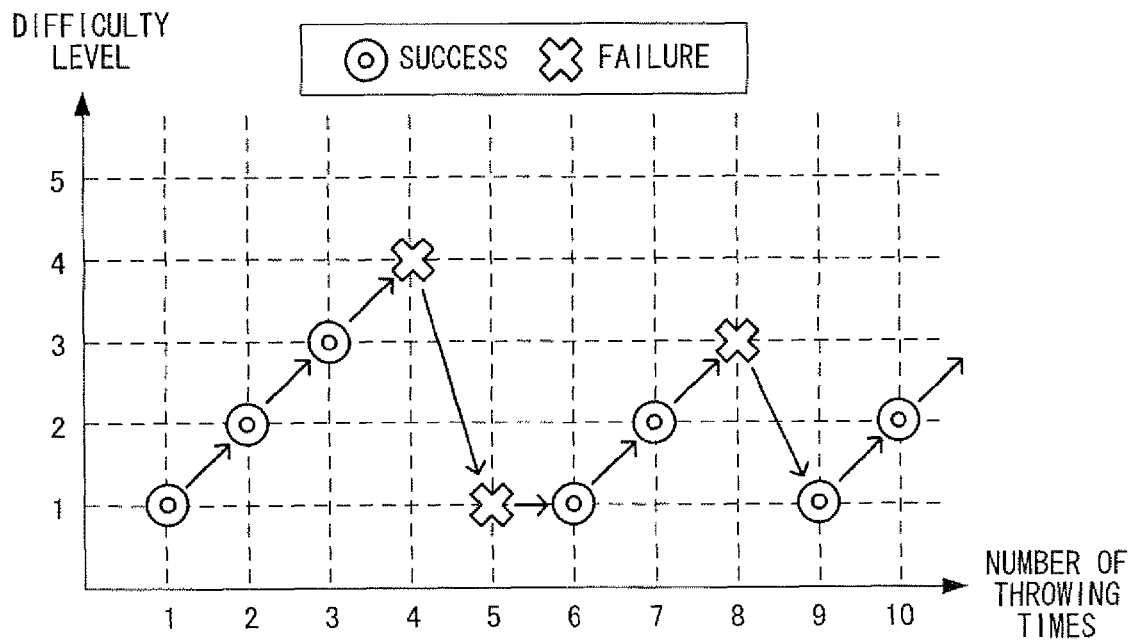
FIG. 28 is a second exemplary method for updating the difficulty level in accordance with the success or failure in shooting.

FIG. 28 shows an exemplary case where a predetermined value ("1" in the example shown in FIG. 28) is added to the current difficulty level when a shot has been made successfully, whereas the current difficulty level is reset to an initial value ("1" in the example of FIG. 28) when the shot has failed. In this manner, when the shot has failed, the difficulty level is reset to the initial value, and accordingly, the possibility that the player makes miss shots repetitively is lowered, which enables the player to play the game comfortably.

Figure 29:
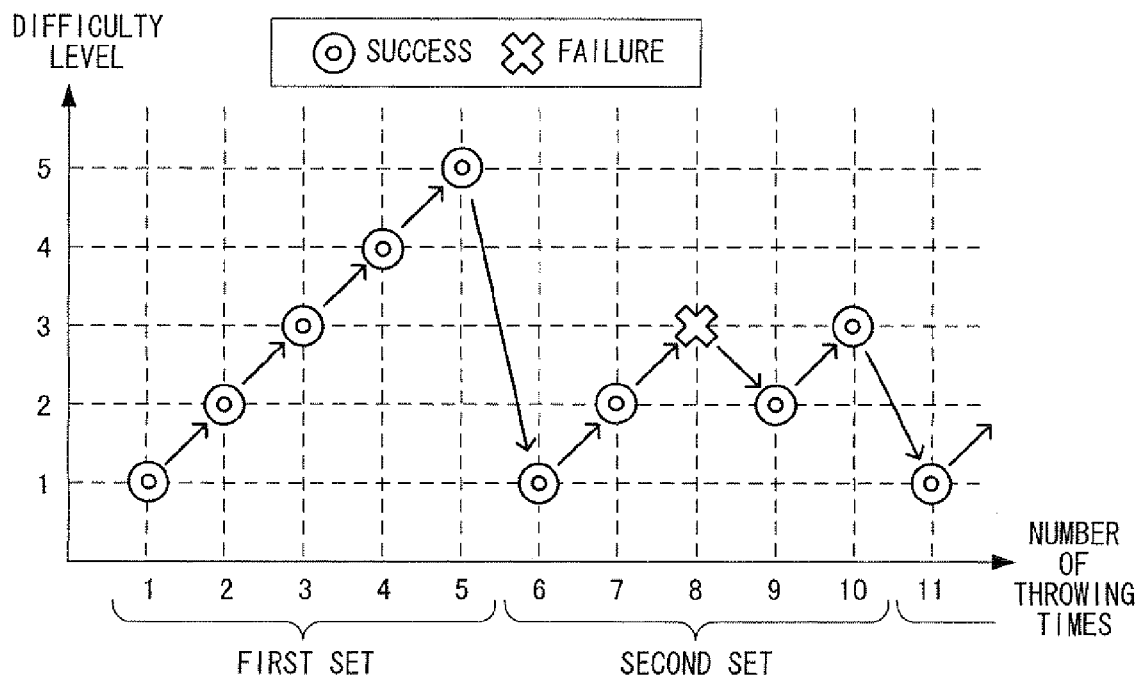
FIG. 29 is a third exemplary method for updating the difficulty level in accordance with the success or failure in shooting.
Figure 30:
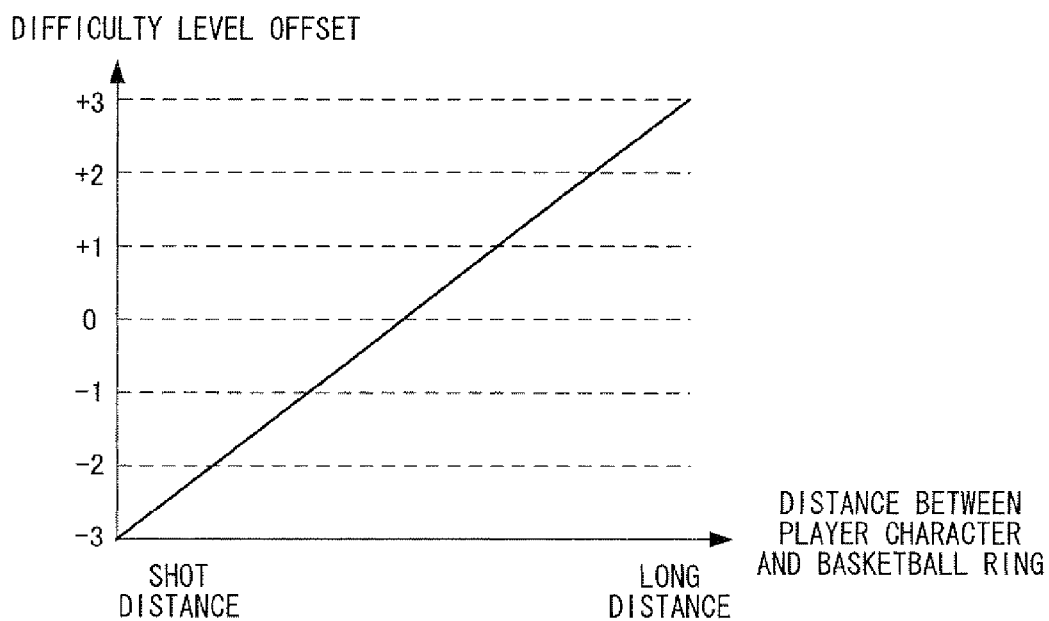
FIG. 30 is a diagram illustrating a relation between a distance from a player character to a basketball ring and a difficulty level offset.

FIG. 29 shows a case where a predetermined value ("1" in the example of FIG. 29) is added to the current difficulty level when a shot is made successfully, whereas a predetermined value ("1" in the example of FIG. 29) is subtracted from the current difficulty level when the shot has failed. In addition, the difficulty level is reset to the initial value ("1" in the example of FIG. 29) each time one set (a set of five shots in the example of FIG. 29) is completed regardless of the success or failure of the shots. Normally, when the player performs a shoot operation relatively immediately after the most recent shoot operation, relatively highly accurate shoot operation can be performed. On the other hand, when the player performs a shoot operation after a certain interval from the most recent shoot operation, the accuracy of the shoot operation tends to deteriorate. Thus, as shown in the example of FIG. 29, the difficulty level is reset to the initial value each time one set is completed, whereby even if there is a long time interval between respective sets due to a theatrical movement of the player character or the like performed between the respective sets, the possibility of failure in the initial shot in each set is lowered, which enables the player to play the game comfortably.

In the present embodiment, the difficulty level is updated in accordance with the success or failure of a shot. However, the difficulty level may be determined based not only on the success and failure of a shot, but also on other conditions. For example, in a basketball game in which a player causes a player character to move to a desired position and to perform shooting, the difficulty level, which is updated in accordance with the success or failure of a shot, is stored in the external main memory 12 as a "basic difficulty level". To determine the maximum successful twist amount Rmax and the minimum successful twist amount Rmin in step S29, a difficulty level offset, which depends on a distance between the player character and the basketball ring, is added to the basic difficulty level, whereby the maximum successful twist amount Rmax and the minimum successful twist amount Rmin may be determined. In this case, the CPU10 can determine the difficulty level offset with the use of a function or a table shown in FIG. 30.

When the step S32 ends, the shooting process ends.

Next, a method for correcting the twist amount R in step S27 shown in FIG. 16 will be described.

In the present embodiment, the twist amount R of first to fourth shots are stored in the external main memory 12 as the "twist amount R1 of the first shot" to the "twist amount R4 of the fourth shot", respectively. At the time of a shooting process for a fifth shot or thereafter, the current twist amount R (the twist amount R calculated in immediately preceding step S25) is corrected with the use of the "twist amount R1 of the first shot" to the "twist amount R4 of the fourth shot". Specifically, an average value of the "twist amount R1 of the first shot" to the "twist amount R4 of the fourth shot" is calculated, and the calculated average value is subtracted from the current twist amount R.

In the present embodiment, since the target value of the twist amount R required in the game is "0", the twist amount R represents deviation of the angular velocity around the Z-axis at the time of throwing from the target angular velocity. Accordingly, the average value of the "twist amount R1 of the first shot" to the "twist amount R4 of the fourth shot" represents a degree of average deviation, from the target angular velocity, of the angular velocities around the Z-axis at the time of throwing the first to fourth shots. That is, when the average value of the "twist amount R1 of the first shot" to the "twist amount R4 of the fourth shot" is calculated, it is possible to know the behavior of a player at the time of the shoot operation (namely, it is possible to know a degree of deviation tendency of the angular velocity around the Z-axis at the time of throwing with respect to the target angular velocity). In other words, in the present embodiment, as an index indicative of a degree of deviation tendency (hereinafter referred to as a "deviation tendency value") of the twist amount R detected in accordance with the shoot operation relative to the target value of the twist amount R required in the game (in the present embodiment, "0"), the average value of the "twist amount R1 of the first shot" to the "twist amount R4 of the fourth shot" is used. However, the method for calculating the deviation tendency value is not limited to this.

Based on the above deviation tendency value, the twist amount R is corrected, whereby the behavior peculiar to respective players in the shoot operation (i.e., a player's behavior in moving his/her arm or wrist at the time of performing the shoot operation) can be offset with respect to the fifth and the following shots. In the case of a button switch operation conventionally performed, there is no problem of the behavior peculiar to each player. On the other hand, the game using the angular velocity of the input device 8, as in the case of the present embodiment, is largely affected by the behavior of the player in moving his/her arm and wrist, which could be advantageous to one player, and could be disadvantageous to another. For example, even if a player can repeat a throwing motion in a stable manner, it may be difficult for the player to make a successful shot as long as the player has a behavior of always twisting his/her wrist at or around the time of throwing detection. In the present embodiment, thus, the behavior of the player (that is, tendency of the twist amount R when the shoot operation is performed) is detected based on the twist amount R obtained from the shoot operation for the first to fourth shots, and the twist amount R is corrected with respect to the shoot operation for the fifth and the following shots such that the detected behavior of the player is offset. Accordingly, even if the first to fourth shots have failed due to the behavior peculiar to the player, the azimuth φ in the throwing direction of the fifth and the following shots will be "0", i.e., the target value, as long as the player constantly performs the shoot operation in a fixed form, and consequently a successful shot may be achieved.

In the present embodiment, the behavior of a player (i.e., deviation tendency value) is detected based on the shoot operation for the first to fourth shots in the case of performing a total of 25 shots in a basketball game. However, the shoot operation for which shot(s) is used to detect the behavior of the player is arbitrary determined. For example, the behavior of a player may be detected based on the shoot operation for the first shot to the most recent shot.

Further, in the present embodiment, the twist amount R is corrected for the fifth and the following shots. However, the twist amount R may be corrected for a shot before the fifth shot (e.g., a third shot) by detecting the behavior of the player based on the shoot operation performed prior to the shot (e.g., the shoot operation for the first and second shots).

In the present embodiment, the average value of the "twist amount R1 of the first shot" to the "twist amount R4 of the fourth shot" is calculated, and the calculated average value is subtracted from the current twist amount R. However, instead of a simple average value, an arbitrary representing value, such as a weighted average value, a mode value, a median value, and the like may be used in accordance with the intended purpose. The number of shots to calculate the average is not necessarily 5, but may be other numbers. Alternatively, the average of most recent predetermined number of shots may be used.

Further, in the present embodiment, the behavior of the player is corrected and offset with respect to the twist amount R, however, the behavior of the player may be corrected and offset with respect to an arbitrary parameter determined based on the angular velocity data. For example, based on the "local maximum value of the swing strength P" detected from the first to fourth shots, the deviation tendency value indicative of the tendency of deviation of the local maximum value of the swing strength P relative to an ideal value (e.g., the median value in the successful range shown in FIG. 22) is calculated. The deviation tendency value is used for the fifth and the following shots, whereby the "local maximum value of the swing strength P" may be corrected. The "orientation in the pitch direction of the controller at the time of throwing", which is used in step S22, may be corrected in a similar manner.

As described above, in the present embodiment, the successful range of the azimuth φ in the throwing direction of a ball, when a player performs a shoot operation by swinging the input device 8, may be changed in accordance with the difficulty level, and thus the game will not become too monotonous. In the present embodiment, the successful range of the azimuth φ is changed depending on the difficulty level, however, in another embodiment, the successful range of the elevation angle θ or the successful range of the initial velocity V may be changed depending on the difficulty level.

According to the present embodiment, the difficulty level can be changed depending on the success or failure of a shot, and thus the player will not feel the game too easy or too difficult. In the present embodiment, although the difficulty level is changed depending on the success or failure of a shot, in another embodiment, the difficulty level may be changed depending on the success or failure of an arbitrary game operation using the angular velocity.

Further, in the present embodiment, while the player is playing the basketball game, the behavior of the player's shoot operation is learned, whereby the angular velocity of the input device 8 around the Z-axis is corrected. Thus, the behavior peculiar to each player may be offset. Although, in the present embodiment, the angular velocity of the input device 8 around the Z-axis is corrected, in another embodiment, the angular velocity of the input device 8 around the X-axis, or the angular velocity around the Y-axis may be corrected.

In the present embodiment, a case of executing a basketball game on the game apparatus 3 has been described, however, it is understood that the present invention may be applicable to any games other than the basketball game.

For example, in a golf game, in which a player swings the input device 8 so that a player character in a virtual game space swings a golf club and hits a golf ball, success or failure of respective swings may be determined depending on whether the golf ball stops on a fair way or on a rough, and depending a result of the determination, the difficulty level (a successful range of the angular velocity of the input device 8 required when the player performs the swing operation) may be changed.

For example, in the above golf game, in the case of playing a total of 18 holes of golf, the player's behavior in a swing operation is learned based on the player's swing operation for the first hole. The angular velocity of the input device 8, which is detected at the time of the player's swing operation, may be corrected, such that the player's behavior is offset at the time of the player's swing operation for the second and the following holes.

The basketball game in the present embodiment is played by one player. However, in another embodiment, in a game in which a plurality of players play a match, the difficulty level may be set and updated for each player, individually. For example, when two players, that is, a first player and a second player are to play a match of a basketball game while operating different teams, respectively, the difficulty level for the first player may be updated depending on the success or failure of the shoot operation by the first player, whereas the difficulty level for the second player may be updated depending on the success or failure of the shoot operation by the second player. Accordingly, even if players whose level of skill is different from each other are to play a match, since the difficulty level is set appropriately to each player depending on his/her level of skill, it is possible to effectively avoid one-sided match progress.

In the present embodiment, when the swing strength P reaches its local maximum, and the value is greater than the throwing threshold, the player character is caused to perform shooting. However, a timing at which the player character is caused to perform shooting is not limited to this.

In the present embodiment, the initial value of the difficulty level is set to "1", however, the initial value of the difficulty level may be another value (e.g., "5")

Further, in the present embodiment, the initial velocity and the throwing direction of a ball are determined based on the shoot operation by the player, however, the present invention is not limited to this. Movement of an arbitrary object other than the ball may be controlled based on the angular velocity around a predetermined axis of the input device (controller) operated by the player.

Further, in the present embodiment, the angular velocities in the three-axis directions are detected by the gyro-sensors 55 and 56, however, the present invention may be realized by detecting the angular velocity in a one-axis direction or two-axis directions.

Further, in the present embodiment, the input device 8 and the game apparatus 3 are connected to each other via wireless communication, however, the input device 8 and the game apparatus 3 may be electrically connected to each other via a cable.

Further, in the present embodiment, the CPU 10 of the game apparatus 3 executes a game program, whereby the processes in the above flowchart are performed. In another embodiment, some or all of the above processes may be performed by a dedicated circuit provided to the game apparatus 3.

While the invention has been described in detail, the foregoing description is in all aspects illustrative and not restrictive. It is understood that numerous other modifications and variations can be devised without departing from the scope of the invention.

What is claimed is:

1. A game apparatus comprising:
a wireless communication interface for communicating with a handheld game controller; and
a game processing system, comprising at least one computer processor configured to provide operations comprising:
execution of a game based on angular velocity data, and determination of success or failure of the game in accordance with at least one first value based on the angular velocity data, wherein the angular velocity data is obtained from an angular velocity sensor that moves in accordance with the handheld game controller which is configured to communicate with the game apparatus via the wireless communication interface, wherein the at least one first value represents one or more of an orientation of the handheld controller and a swing strength associated with the handheld controller being moved by a user, and wherein the orientation and the swing strength are determined in accordance with angular velocity of the handheld controller detected in a plurality of axes by the angular velocity sensor as the handheld controller is moved by the user;
difficulty level setting for variably setting, in a memory of the game apparatus, a second value representing a difficulty level of the game; and
difficulty level control for automatically changing, in accordance with variation in the second value set by the difficulty level setting, a successful range of the at least one first value based on the angular velocity data, the successful range being a range in which the game is determined to be successful by the game processing system.

2. The game apparatus according to claim 1, wherein the higher the second value set by the difficulty level setting is, the narrower the successful range is made by difficulty level control.

3. The game apparatus according to claim 1,
wherein the game processing system is configured to execute, multiple times, the game based on the angular velocity data, and to determine the success or failure of the game in each of the multiple times, and when a result of the game in a certain numberth time is
determined to be successful, the difficulty level setting
sets the difficulty level of a subsequent game to be higher
than the difficulty level of the game in the certain numberth time.

4. The game apparatus according to claim 1,
wherein the game processing system is configured to
execute, multiple times, the game based on the angular
velocity data, and to determine the success or failure of
the game in each of the multiple times, and
when a result of the game in a certain numberth time is
determined to have failed, the difficulty level setting sets
the difficulty level of a subsequent game to be lower than
the difficulty level of the game in the certain numberth
time.

5. The game apparatus according to claim 1,
wherein, based on first angular velocity data obtained from
a first angular velocity sensor provided to a first controller operated by a first player, and on second angular
velocity data obtained from a second angular velocity
sensor provided to a second controller operated by a
second player, the game processing system is configured
to execute a game in which the first player and the second
player play a match, and to determine success or failure
of a first game operation by the first player and success or
failure of a second game operation by the second player
in accordance with values based on the first angular
velocity data and the second angular velocity data,
respectively,
the difficulty level setting sets a difficulty level of the first
game operation, and a difficulty level of the second game
operation, individually, and
the difficulty level control changes, in accordance with the
difficulty level of the first game operation set by the
difficulty level setting, a successful range of the first
angular velocity data, in which the first game operation
is determined to be successful by the game processing
system, and also changes, in accordance with the difficulty level of the second game operation set by the
difficulty level setting, a successful range of the second
angular velocity data, in which the second game operation is determined to be successful by the game processing system.

6. The game apparatus according to claim 5, wherein the
difficulty level setting sets the difficulty level of a subsequent
game in accordance with the success or failure of the first
game operation in a certain numberth time, and also sets a
difficulty level of a subsequent game in accordance with the
success or failure of the second game operation in a certain
numberth time.

7. The game apparatus according to claim 1, wherein
the difficulty level of the game is updated in accordance
with the success or failure of the game, and the successful range of the value based on the angular velocity data
is changed in accordance with the update of the difficulty
level performed in accordance with the success or failure
of the game.

8. The game apparatus according to claim 1, wherein
the difficulty level of the game is updated during the game,
and the successful range of the value based on the angular velocity data is changed in accordance with the
update of the difficulty level performed during the game.

9. A non-transitory computer-readable storage medium
having stored thereon a game program which, when executed
by a computer of a game apparatus having a wireless communication interface for communicating with a handheld
game controller, causes the computer, based on operation data
including angular velocity data obtained from an angular
velocity sensor provided to a controller, to perform operations
comprising:
executing a game based on the angular velocity data, and
determining success or failure of the game in accordance
with at least one first value based on the angular velocity
data, wherein the angular velocity data is obtained from
an angular velocity sensor that moves in accordance
with the handheld game controller which is configured
to communicate with the game apparatus via the wireless communication interface, wherein the at least one
first value represents one or more of an orientation of the
handheld controller and a swing strength associated with
the handheld controller being moved by a user, and
wherein the orientation and the swing strength are determined in accordance with angular velocity of the handheld controller detected in a plurality of axes by the
angular velocity sensor as the handheld controller is
moved by the user;
variably setting, in a memory of the game apparatus, a
second value representing a difficulty level of the game;
and
automatically changing, in accordance with the variably
set second value, a successful range of the at least one
first value based on the angular velocity data, the successful range being a range in which the executed game
is determined to be successful.

10. The non-transitory computer-readable storage
medium, according to claim 9, wherein the higher the set
difficulty level is, the narrower the automatically changed
successful range.

11. The non-transitory computer-readable storage medium
according to claim 9, the operations further comprising:
executing, multiple times, the game based on the angular
velocity data, and determining the success or failure of
the game in each of the multiple times, and
when a result of the game in a certain numberth time is
determined to be successful, setting the difficulty level
of a subsequent game to be higher than the difficulty
level of the game in the certain numberth time.

12. The non-transitory computer-readable storage medium
according to claim 9, the operations further comprising:
executing, multiple times, the game based on the angular
velocity data, and determining the success or failure of
the game in each of the multiple times, and
when a result of the game in a certain numberth time is
determined to have failed, setting the difficulty level of a
subsequent game to be lower than the difficulty level of
the game in the certain numberth time.

13. The non-transitory computer-readable storage medium
according to claim 9, the operations further comprising:
wherein, based on first angular velocity data obtained from
a first angular velocity sensor provided to a first controller operated by a first player, and on second angular
velocity data obtained from a second angular velocity
sensor provided to a second controller operated by a
second player, executing a game in which the first player
and the second player play a match, and determining
success or failure of a first game operation by the first
player and success or failure of a second game operation
by the second player in accordance with values based on
the first angular velocity data and the second angular
velocity data, respectively,
setting a difficulty level of the first game operation, and a
difficulty level of the second game operation, individually, and changing, in accordance with the set difficulty level of the first game operation, a successful range of the first angular velocity data, in which the first game operation is determined to be successful, and also changing, in accordance with the set difficulty level of the second game operation, a successful range of the second angular velocity data, in which the second game operation is determined to be successful.

14. The non-transitory computer-readable storage medium according to claim 13, the operations further comprising:
setting the difficulty level of a subsequent game in accordance with the success or failure of the first game operation in a certain numberth time, and also setting a difficulty level of a subsequent game in accordance with the success or failure of the second game operation in a certain numberth time.

15. A game apparatus configured to perform a game process based on operation data including angular velocity data obtained from an angular velocity sensor provided to a handheld game controller, the game apparatus comprising:
a communications interface configured to wirelessly receive the operation data from the handheld game controller; and
one or more processors configured to:
execute a game based on the angular velocity data, and to determine success or failure of the game in accordance with at least one first value based on the angular velocity data, wherein the angular velocity data is obtained from an angular velocity sensor that moves in accordance with the handheld game controller which is configured to communicate with the game apparatus via the wireless communication interface, wherein the at least one first value represents one or more of an orientation of the handheld controller and a swing strength associated with the handheld controller being moved by a user, and wherein the orientation and the swing strength are determined in accordance with angular velocity of the handheld controller detected in a plurality of axes by the angular velocity sensor as the handheld controller is moved by the user;
variably set, in a memory of the game apparatus, a second value representing a difficulty level of the game; and
automatically change, in accordance with variation in the second value, a successful range of the at least one first value based on the angular velocity data, the successful range being a range in which the game is determined to be successful by the game processor.

* * * * *